(12) United States Patent
Wald et al.

(10) Patent No.: US 10,249,073 B2
(45) Date of Patent: Apr. 2, 2019

(54) DISTRIBUTED FRAME BUFFER AND API FOR SCALABLE PARALLEL RENDERING

(71) Applicant: Intel Corporation, Santa Clara, CA (US)

(72) Inventors: Ingo Wald, Austin, TX (US); Gregory P. Johnson, Sun Lakes, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/805,367

(22) Filed: Jul. 21, 2015

(65) Prior Publication Data
US 2017/0024924 A1   Jan. 26, 2017

(51) Int. Cl.
G06T 15/00 (2011.01)
G06T 15/06 (2011.01)
G06T 1/60 (2006.01)
G09G 5/00 (2006.01)

(52) U.S. Cl.
CPC ........... G06T 15/005 (2013.01); G06T 1/60 (2013.01); G06T 15/06 (2013.01); G09G 5/00 (2013.01); G06T 2200/04 (2013.01); G06T 2200/28 (2013.01)

(58) Field of Classification Search
CPC ......... G06T 1/20; G06T 2210/52; G06T 1/60; G09G 5/363; G09G 2352/00; G09G 2360/06
See application file for complete search history.

(56) References Cited

U.S. PATENT DOCUMENTS

| | | | | |
|---|---|---|---|---|
| 6,154,223 A * | 11/2000 | Baldwin | ............ | G06T 1/20 345/505 |
| 6,380,935 B1 * | 4/2002 | Heeschen | ............ | G06T 15/005 345/423 |
| 7,061,495 B1 * | 6/2006 | Leather | ............ | G06T 11/40 345/421 |
| 7,870,557 B2 | 1/2011 | Fontaine et al. | | |
| 8,806,513 B2 | 8/2014 | Munshi et al. | | |
| 2009/0303245 A1 * | 12/2009 | Soupikov | ............ | G06T 15/005 345/582 |

FOREIGN PATENT DOCUMENTS

WO   WO-2015-035129   3/2015

OTHER PUBLICATIONS

PCT Notification of International Preliminary Report on Patentability and Written Opinion of the International Searching Authority for International Application No. PCT/US2016/034074, dated Feb. 1, 2018, 11 pages.
PCT/US2016/034074, "Notification of Transmittal of the International Search Report and the Written Opinion of the International Searching Authority, or the Declaration" dated Sep. 30, 2016, pp. 15.

* cited by examiner

*Primary Examiner* — Samantha (Yuehan) Wang
(74) *Attorney, Agent, or Firm* — Womble Bond Dickinson (US) LLP

(57) ABSTRACT

Embodiments provide for a graphics processing apparatus comprising multiple compute nodes coupled to a communication layer, a rendering system executing on the multiple compute nodes, wherein the communication layer enables a distributed object executing on one of the multiple compute nodes to communicate with the rendering system, and a distributed framebuffer logic to subdivide a logical screen space for a frame into multiple regions and subdivide ownership of the regions among the multiple compute nodes.

18 Claims, 20 Drawing Sheets

FIG. 9A GRAPHICS PROCESSOR COMMAND FORMAT 900

FIG. 9B GRAPHICS PROCESSOR COMMAND SEQUENCE 910

DISTRIBUTED FRAME BUFFER AND API FOR SCALABLE PARALLEL RENDERING

TECHNICAL FIELD

Embodiments generally relate to graphics processing logic. More particularly, embodiments relate to graphics processing logic to perform parallel rendering operations.

BACKGROUND

Three-dimension (3D) graphics applications generate image frames by combining input textures, lighting model and physics model. The image generation is intensive in both the number of computational operations required to perform lighting and physics but also in the number of memory operations for fetching the input data and producing processed pixel data for output. Data sizes used for rendering for complex computer visualization operations tend to grow rapidly as scene complexity increases, which may require the use of multiple inter-connected computers (commonly called "nodes" or "ranks") to handle such data. Using multiple nodes, rendering may be performed in a parallel or distributed manner by dividing rendering operations across the multiple nodes. In this context, parallel rendering refers to the use of multiple nodes to collectively work on a rendering task, while data parallel refers to a group of algorithms or applications in which the entirety of the data is distributed across multiple nodes, such that each rank or node may hold only a subset of the data.

A typical implementation of parallel rendering utilizes a single frame buffer at a "master" node, which may also drive an attached display device. The master node may assign different regions of the output image (or frame buffer) to different worker nodes for rendering. Once the worker nodes generate pixel output for their assigned regions, the worker nodes may send the pixel output to the master for storing in the master frame buffer on the master node. The master frame buffer approach leads to a number of problems when performing parallel rendering. For example, when performing rendering for high resolution, multi-display arrangements, gathering all of the pixel data at a single node before sending the pixel data to a display may result in severe memory and/or input/output bus bandwidth issues and can create a scalability bottleneck at the master node. Additional complications can arise when attempting to schedule rendering tasks across the multiple worker nodes, particularly when progressive refinement algorithms are in use, which may require at least a portion of one or more previous frames' data to create pixel output for the current frame. Generally, the master frame buffer creates a bottleneck whenever said frame buffer contains many pixels, and/or many data items per pixel, and/or requires many operations (e.g., per-pixel filtering, post-processing, tone mapping, compression, blending, compositing, etc.) to be performed for each pixel.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
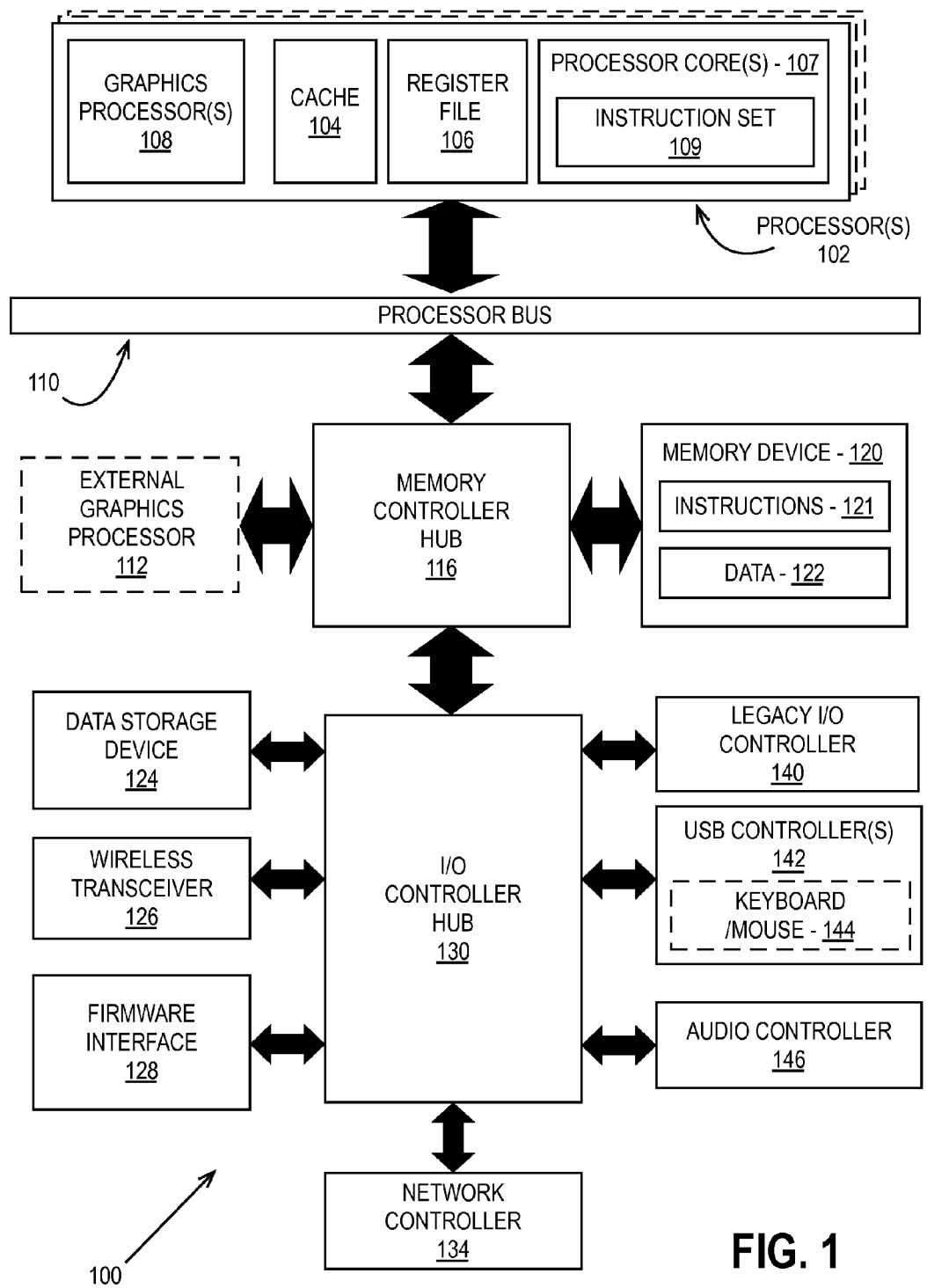
FIG. 1 is a block diagram of an embodiment of a computer system with a processor having one or more processor cores and graphics processors.

Described herein, in various embodiments, is a distributed frame buffer for scalable parallel rendering. Additionally, refinements to existing parallel rendering application programming interfaces are also described to provide enhanced functionality for data-parallel applications when working in conjunction with data parallel renderers. Embodiments described herein may be used in conjunction with data-parallel rasterization operations, data-parallel ray tracing, or data-parallel hybrid rendering which utilizes both rasterization, ray tracing, or any other rendering technology to render a scene, such as, but not limited to splatting or variants of volume rendering.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. The techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

One embodiment provides for a distributed frame buffer to enable scalable parallel rendering by allowing post-processing algorithms to more easily run as a distributed process on worker nodes, as the various worker nodes are provided a mechanism for querying pixel data from the node assigned ownership of the region to be post processed. The communication is distributed across the worker nodes, which generally have greater aggregate communication bandwidth than a single master node, allowing the master node to receive significantly less data.

The distributed frame buffer may be used to provide a common interface for a generalized parallel rendering solution that may be used for parallel ray tracing, parallel rasterization, or any other parallel rendering technique such as, but not limited to, splatting or volume rendering, as well as distributed composition and other screen-space techniques. With respect to composition, the embodiments provide for techniques that enable the overlapping of computation and composition, such that some regions may be composited by a worker node having ownership of the region, while other regions are computed in parallel.

One embodiment provides for API extensions that enable an application that is itself data-parallel to communicate with a data-parallel renderer. The API extensions can enable a data-parallel application to communicate with a data-parallel renderer to express details such as which data is owned where (e.g., which rank/node, etc. has ownership of a particular data object).

In the description that follows, FIGS. 1-12 provide an overview of exemplary data processing system and graphics processor logic that incorporates or relates to the various embodiments. FIGS. 13-20 provide specific details of the various embodiments.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP) or Field-Programmable Gate Array (FPGA).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
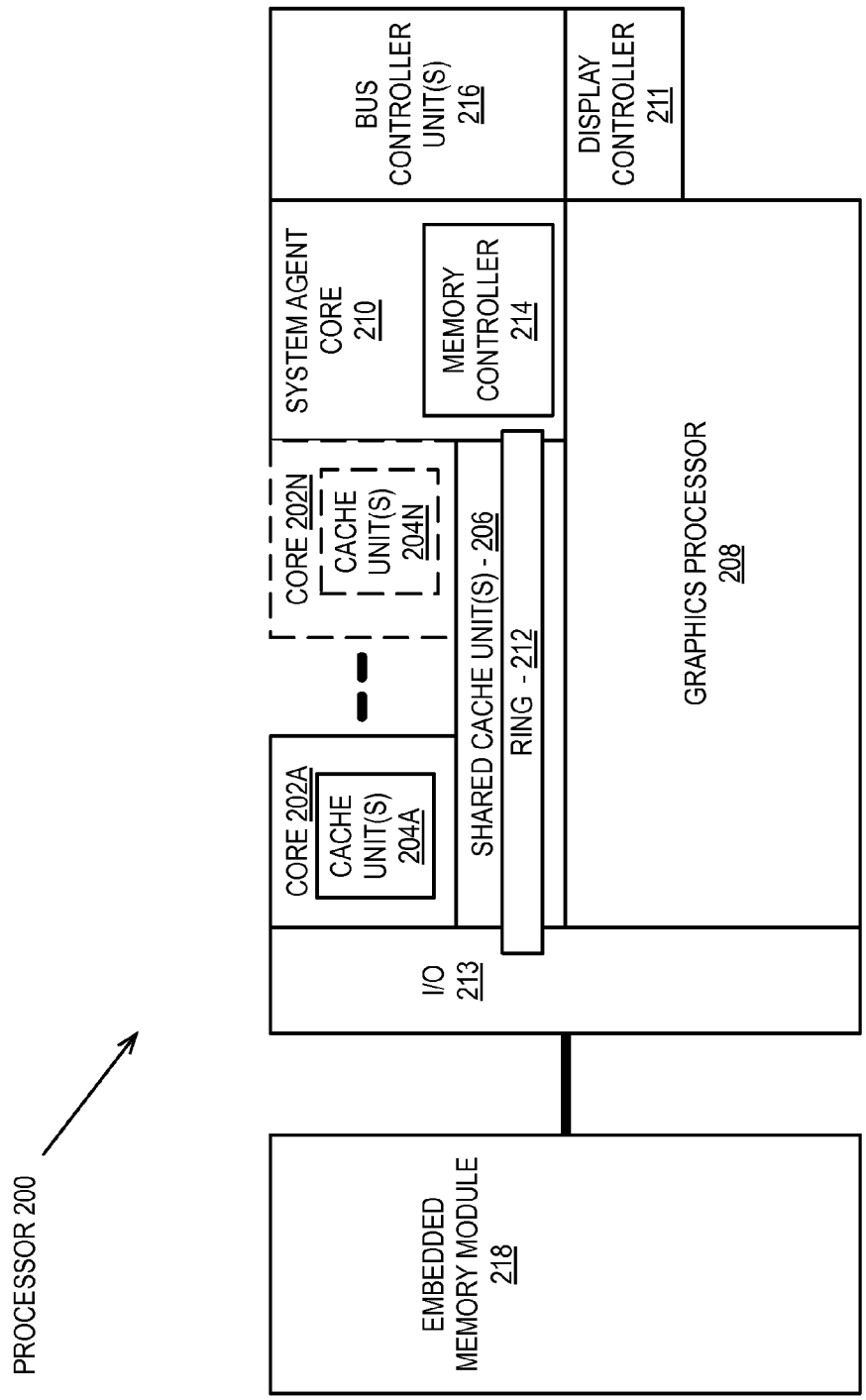
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the interconnect unit (e.g., ring interconnect 212) via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
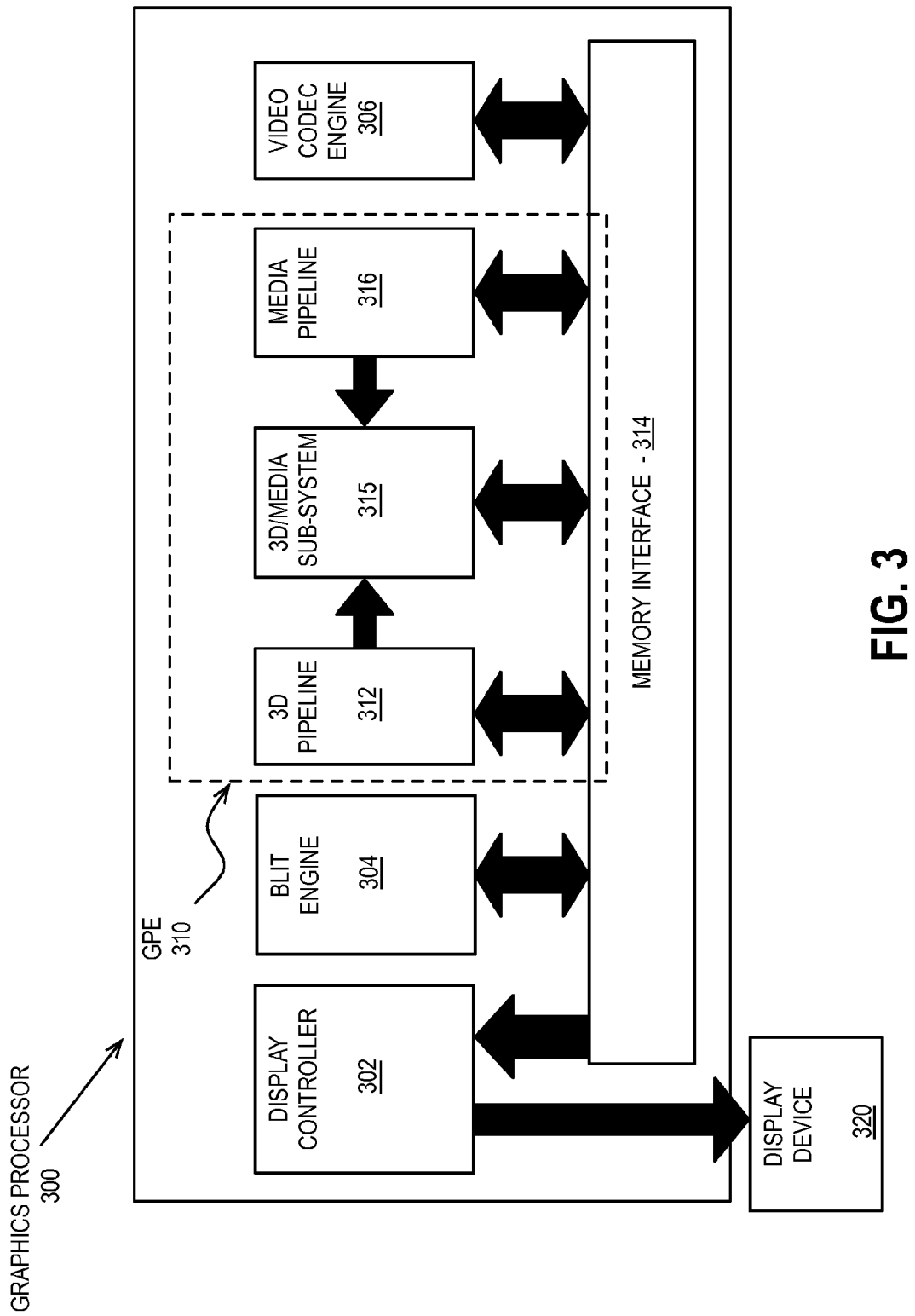
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
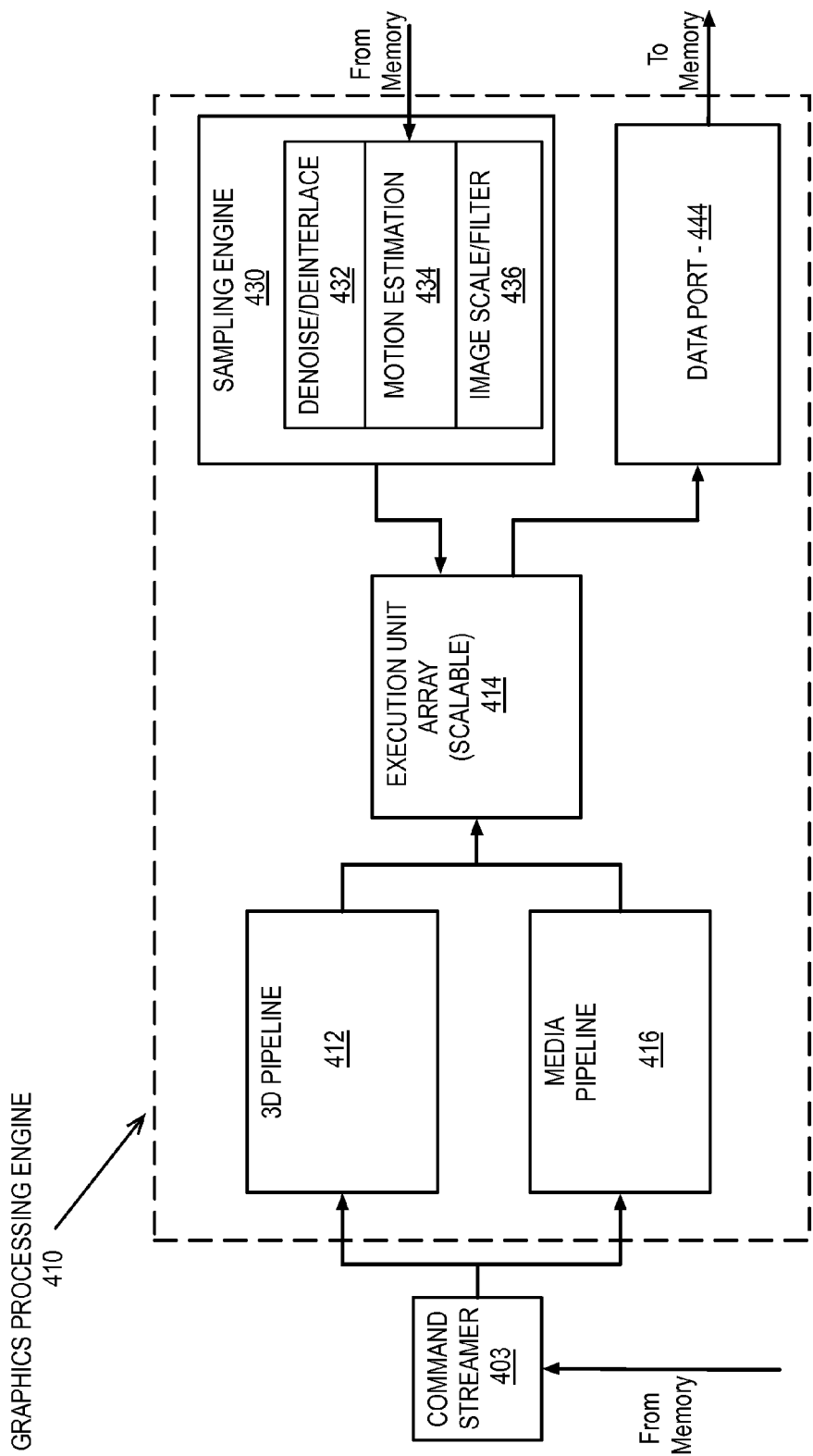
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
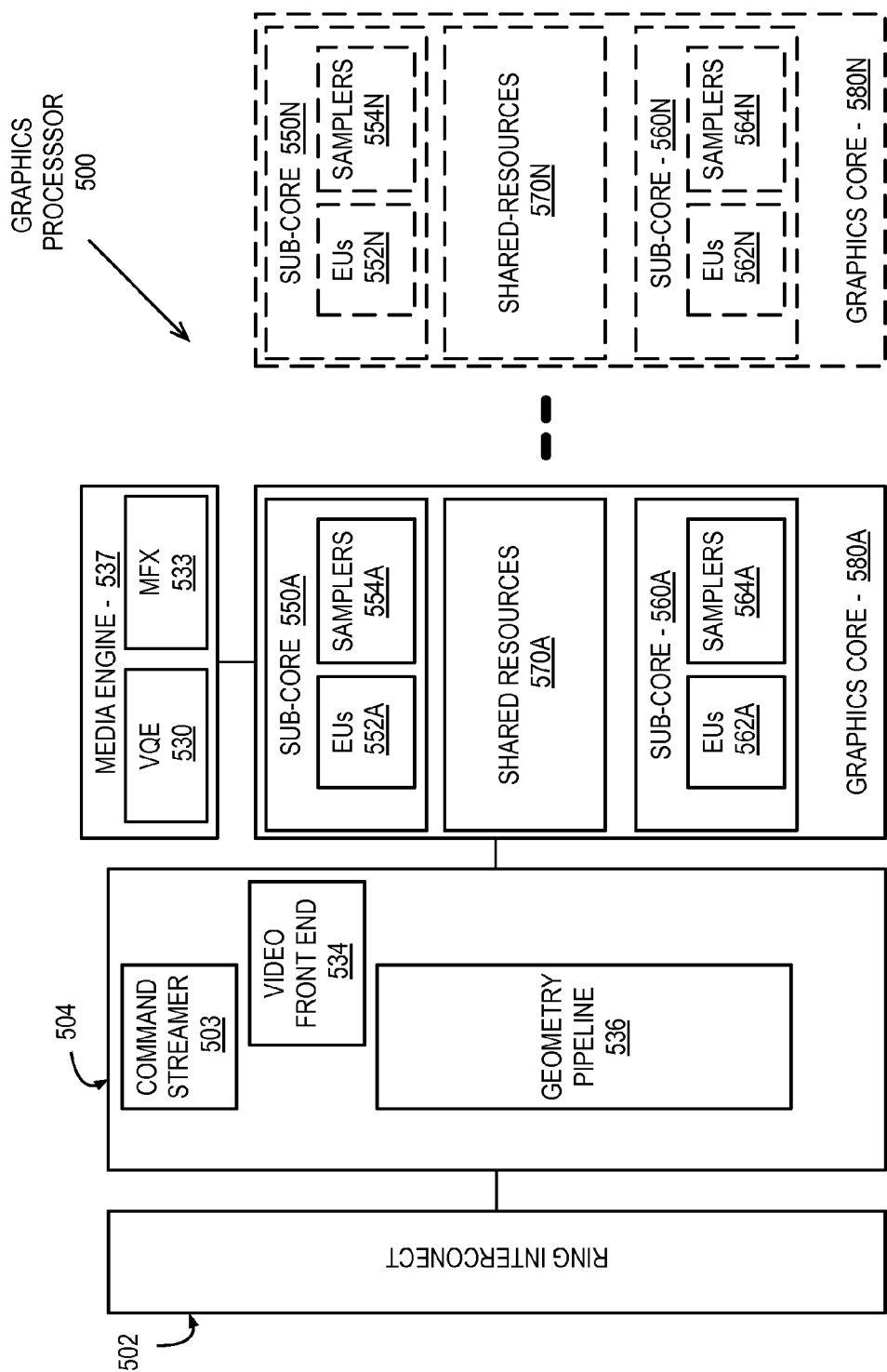
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
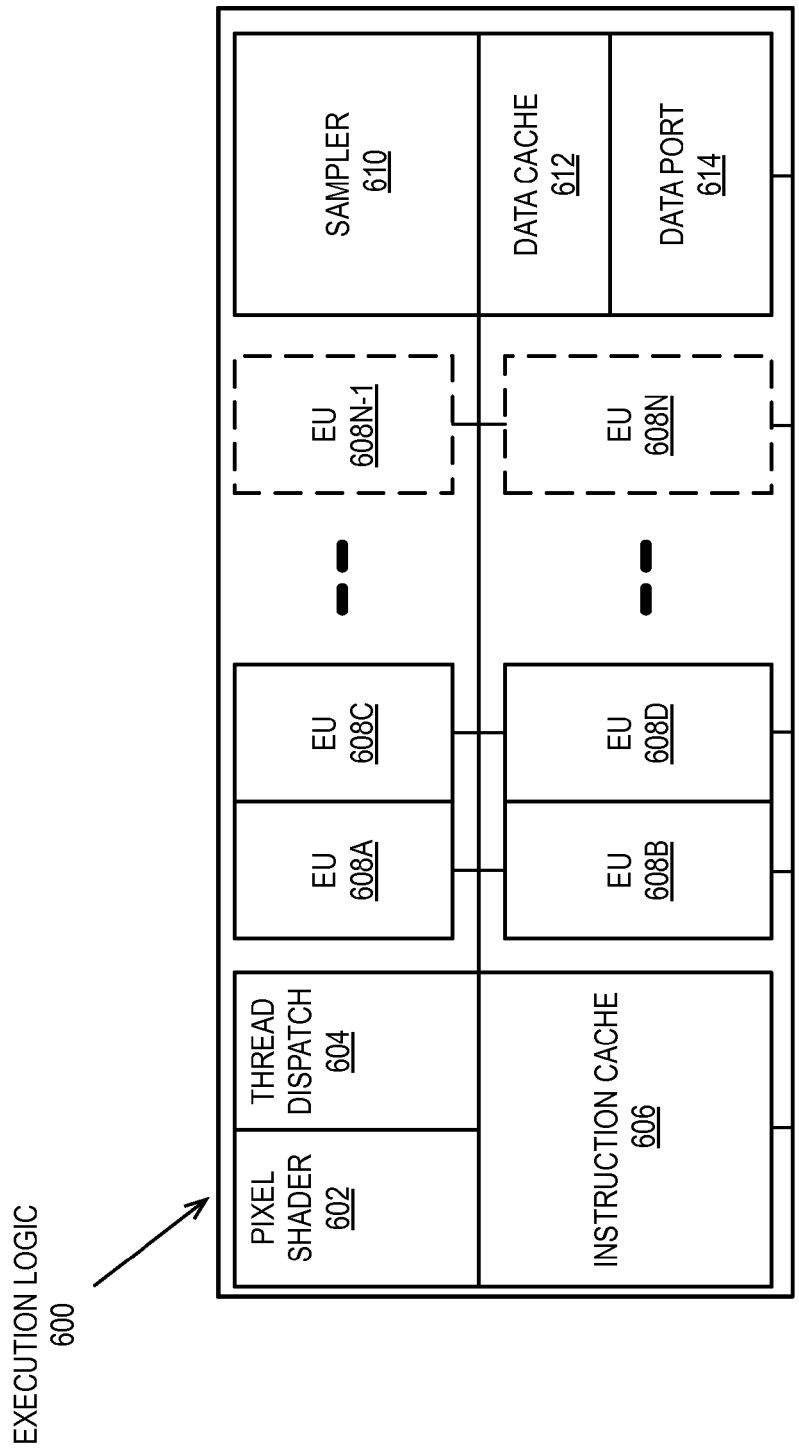
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
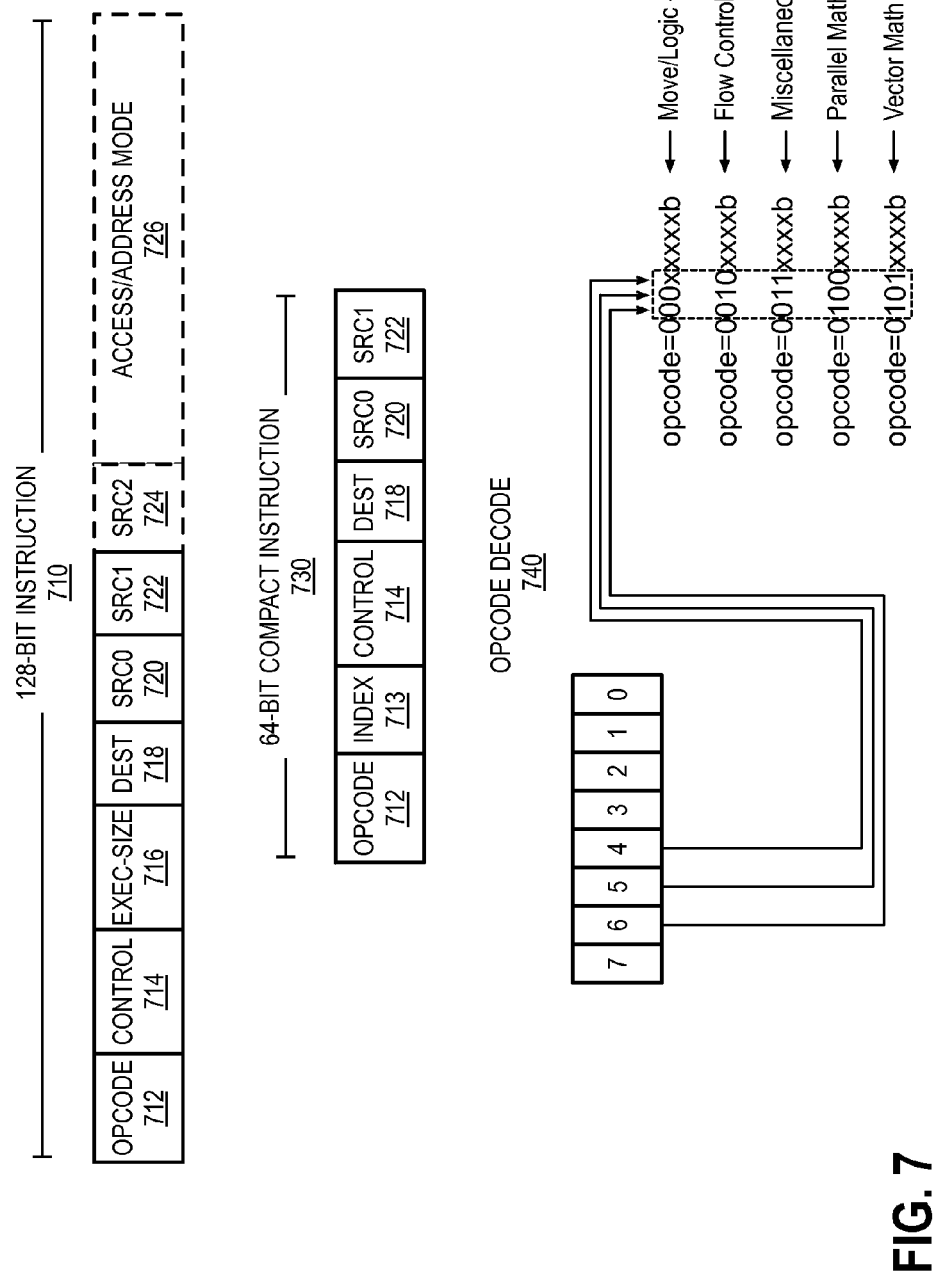
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
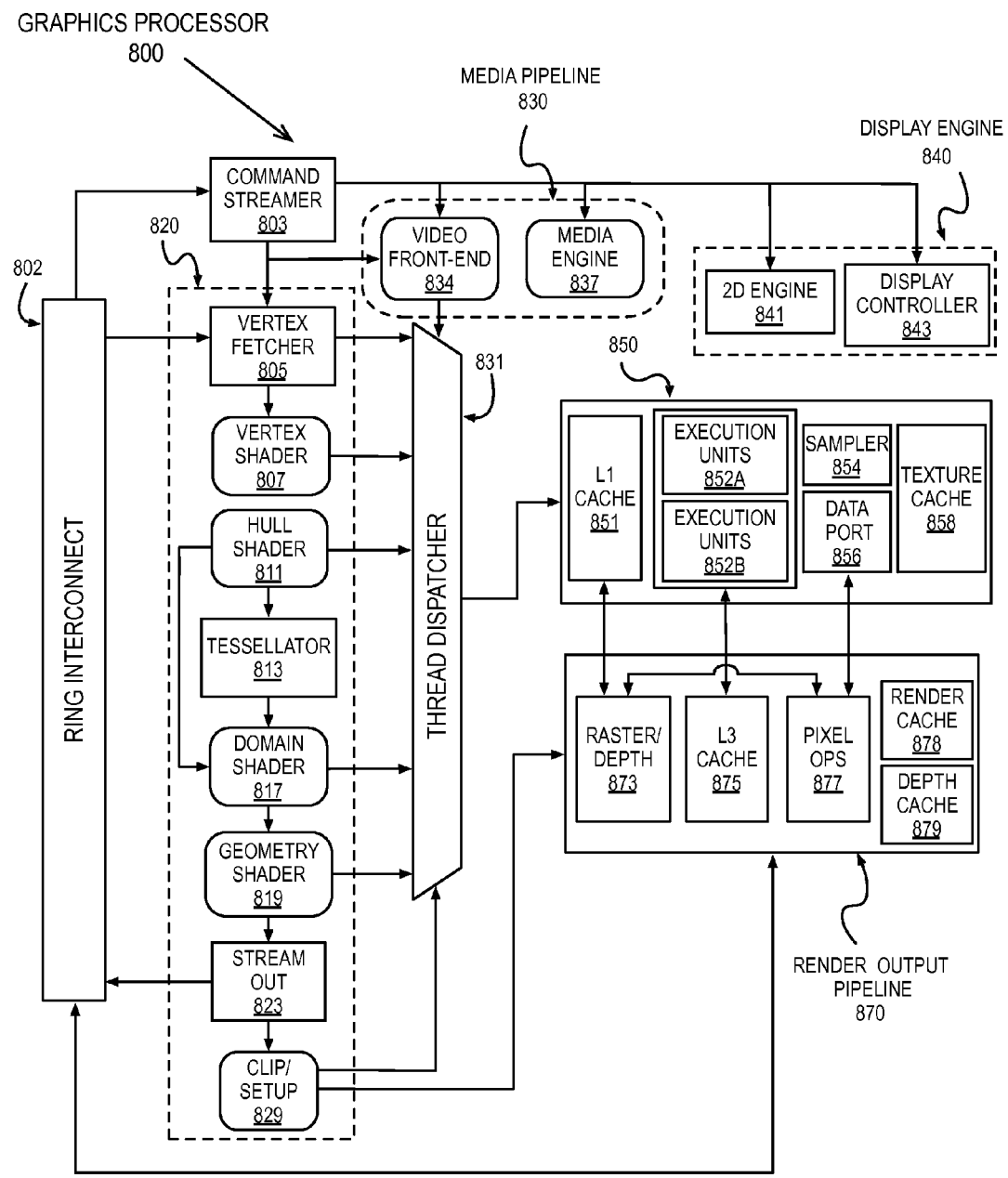
FIG. 8 is a block diagram of another embodiment of a graphics processor which includes a graphics pipeline, a media pipeline, a display engine, thread execution logic, and a render output pipeline.
Figure 9:
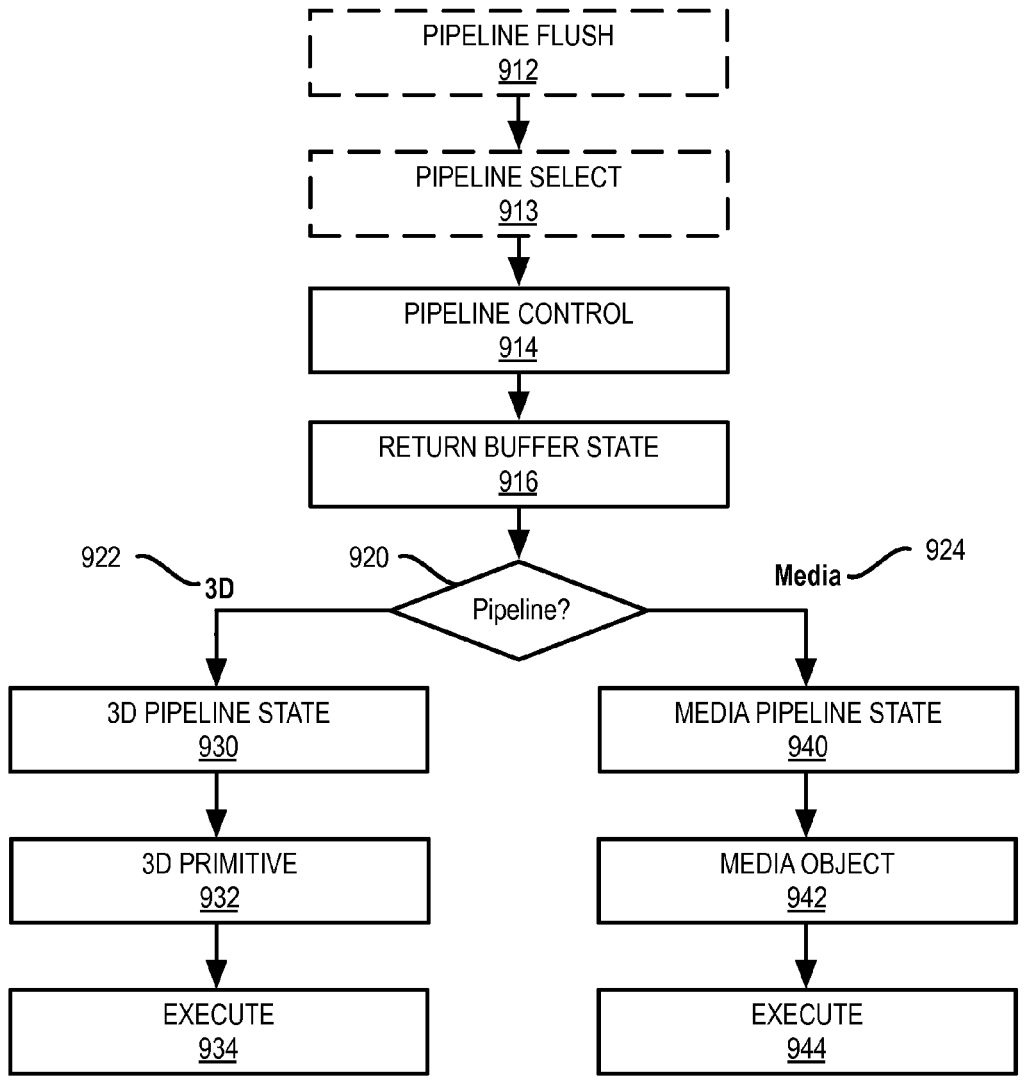
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
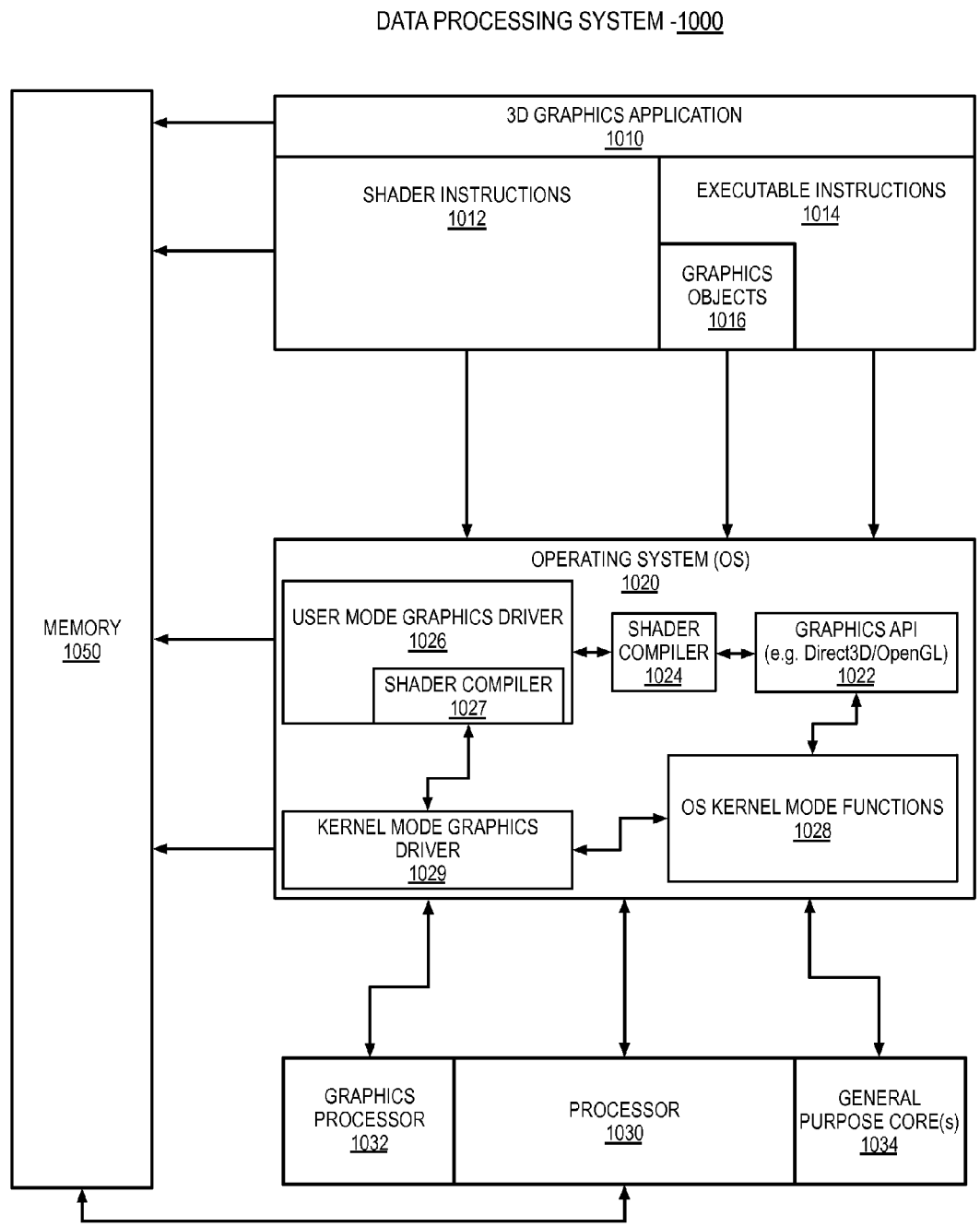
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
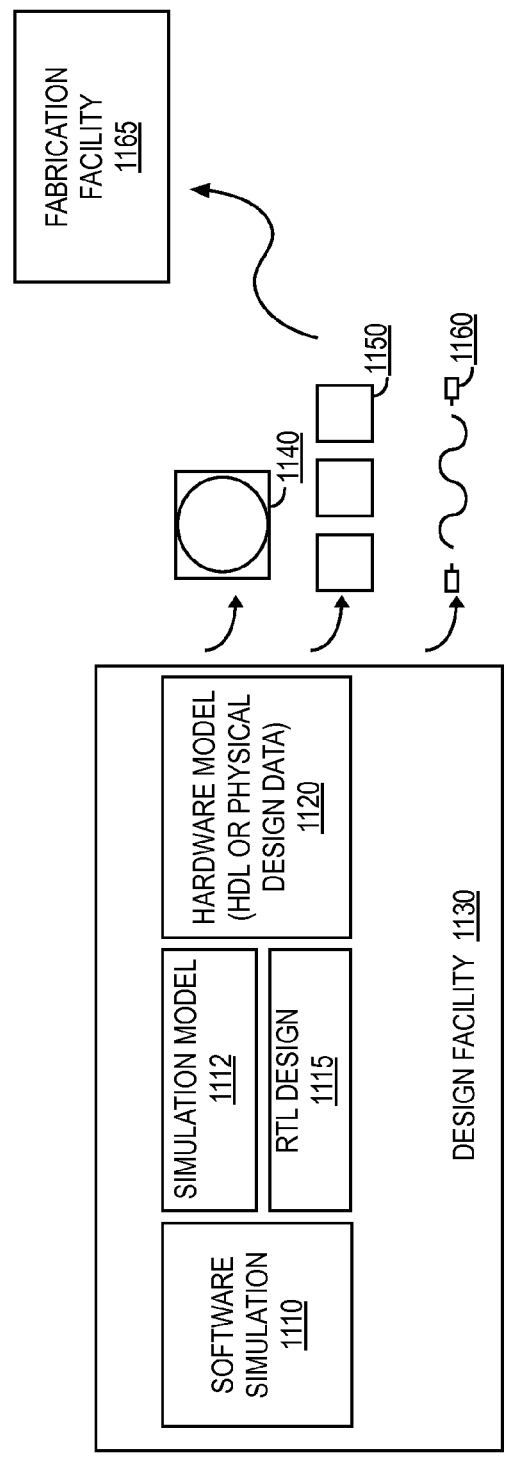
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, reusable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
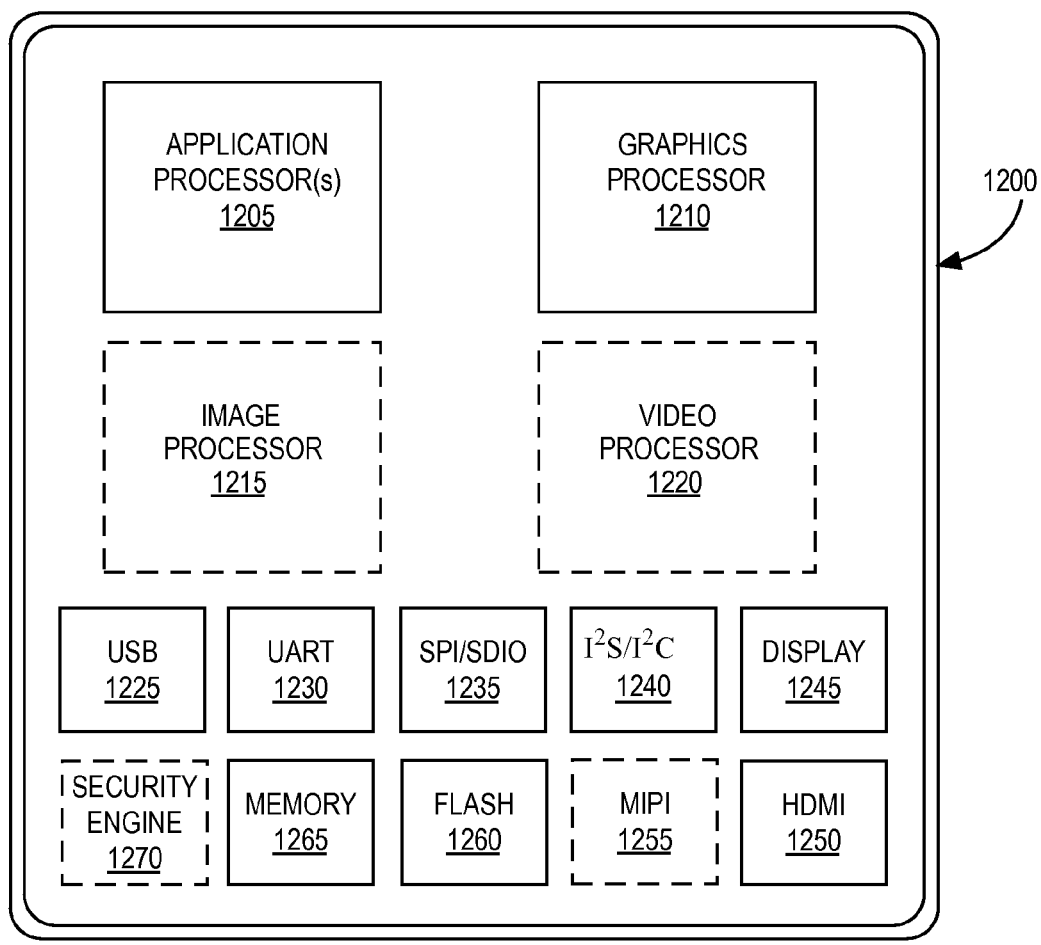
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Distributed Frame Buffer for Scalable Parallel Rendering

A typical implementation of data-parallel rendering (where each node has only partial data) is typically done in either of two ways. An image region based parallel renderer can render an entire image region and either fetches data from other nodes on demand as required for its local computations (the "caching" approach), and/or sends additional render requests for its tile region to those nodes that have the data for those operations. In the more common "sort last" approach, each node renders a full image of its own part of the data and then employs some compositing stage (e.g., using alpha blending or Z compositing) to combine these intermediate images into the final image. The latter is the more common approach, but performance generally suffers due to the bandwidth and compute resources required for the compositing stage, in particular since this compositing is typically performed only after the rendering stage is complete.

In embodiments described herein, a distributed framebuffer avoids a centralized frame buffer and explicit compositing phases on a master node and provides a common infrastructure for scalable rendering. The distributed framebuffer explicitly avoids problems presented by distributed rendering using a centralized frame buffer in which post-processing is performed by the master node. For example, in high-resolution multi-display arrangements, the gathering of all of the pixel data at a single node prior to display can present a severe bandwidth issue and causes scalability issues due to a communications bottleneck at the master. For progressive refinement algorithms such as progressive anti-aliasing, progressive sampling, accumulation buffering, etc., each require data from previous frames to accumulate. However, when utilizing dynamic load balancing, different nodes may be used to compute the same tile between different frames. Accordingly, the worker node for a tile during the current frame may not have access to or knowledge of the location of the data for the tile from the previous frame. Workarounds for this issue either come as the cost of reduced load balancing or limited scalability. Additionally, some rendering and/or filtering techniques require access to neighborhoods of pixels. For example, screen-space filter techniques such as discontinuity buffering, screen-space AO, global tone mappers, progressive resampling, screen-space noise reduction, etc., each require partial data from neighboring tiles or regions. These filtering techniques do not work if the computational node performing the operation does not have access to the neighboring data, which may have been computed by an unknown node, and/or will create a bottleneck if all such data is stored in a centralized master frame buffer. Known workarounds can create additional overhead or otherwise create scalability issues.

Embodiments described herein provide a distributed framebuffer infrastructure to enables efficient parallelization of frame buffer centric operations such as, but not limited to filtering, tone mapping, compositing, and other frame buffer centric operations, in conjunction with distributed and/or data parallel rendering techniques that are usable for parallel rendering engines using either ray-tracing, rasterization (scan conversion), or any other rendering technique such as, but not limited to, splatting or volume rendering. In one embodiment, geometric primitives associated with a region of a scene of data items associated with a volumetric data set can be rendered in a distributed and/or parallel manner across multiple render nodes and the resulting render data (e.g., samples) for the region can be combined at a worker node having ownership of that region, rather than at a master node or at each individual render node. The worker nodes having ownership of a region (e.g., the owner node for the region) can also perform composition or other post processing operations on the region without sending the render data for the region to a master node. While the render computations for each region can be performed using data that is local to each render node, the distributed frame buffer enables access to global context for the scene for each render node.

As described herein, the term ranks and nodes are used interchangeably, where a rank may specify a message passing interface (MPI) rank or process number, and a node may specify the physical compute node upon which a process (e.g., an MPI process or an OpenMP thread) may execute. In general, the concepts described herein apply generally to distributed or data-parallel rendering or computing without regard to the render API or the underlying parallel processing or data distribution implementation.

Figure 13:
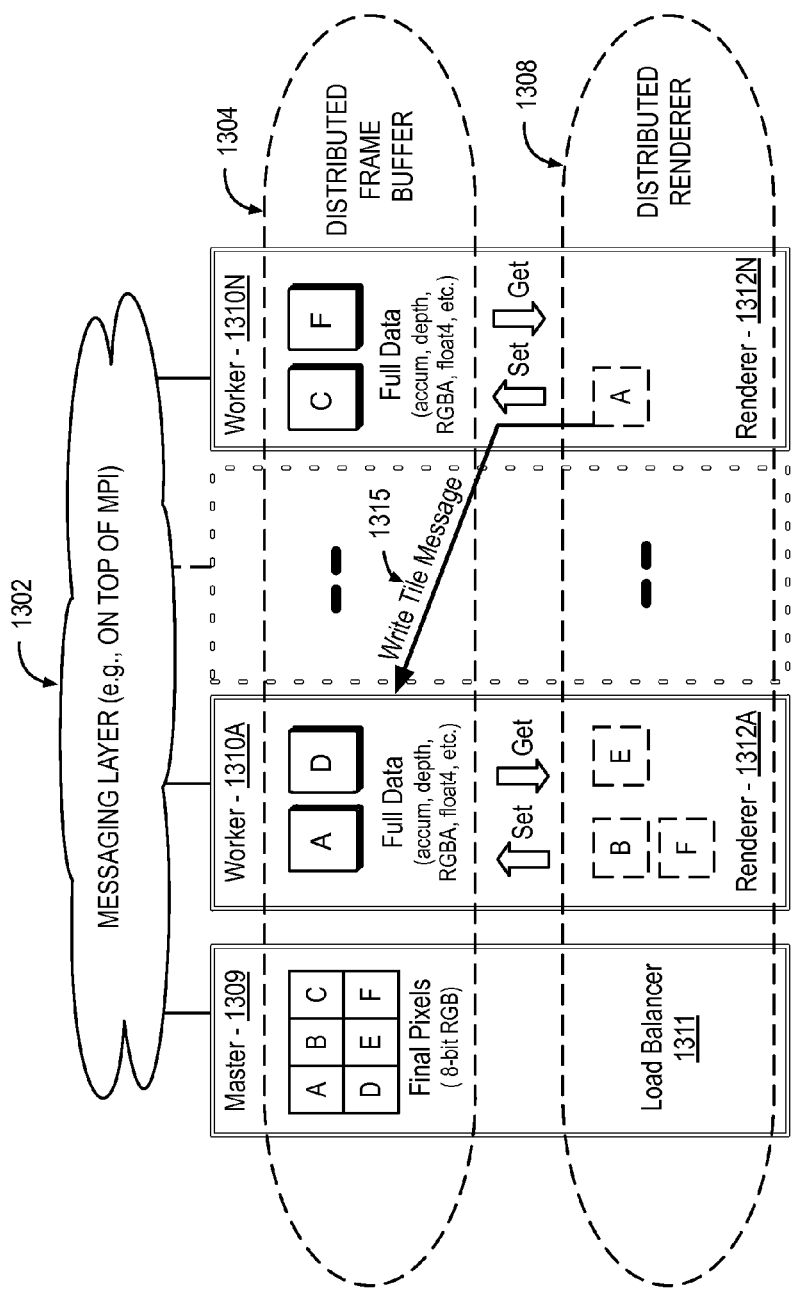
FIG. 13 is a block diagram illustrating a distributed framebuffer system 1300, according to an embodiment.

FIG. 13 is a block diagram illustrating a distributed framebuffer system 1300, according to an embodiment. In one embodiment, the distributed framebuffer system 1300 is configured to facilitate the rendering of multiple pixel tiles across a distributed renderer 1308, although embodiments may render any arbitrary region of pixels and are not limited to tiled regions. In such embodiment, a messaging layer 1302, which may be implemented on top of MPI, couples a master node 1309 with one or more worker nodes 1310A-N. Each of the master node 1309 and the worker nodes 1310A-N can include a portion of a distributed frame buffer 1304 and a distributed renderer 1308. One or more of the worker nodes 1310A-N can be assigned ownership of one or more pixel tiles. Rendering operations for the one or more pixel tiles are performed by one or more of the renderers 1312A-N. In one embodiment, ownership of each tile and rendering operations for each tile are assigned by the master node 1309, where ownership of a tile is assigned independently of the rendering operations for the tile. In one embodiment the master node 1309 includes a load balancer 1311 to load balance the rendering operations that are assigned to the renderers 1312A-N of the distributed renderer 1308.

In one embodiment, the distributed framebuffer 1304 implements "get" and a "set" operations for the tiles. The renderers 1312A-N on each worker 1310A-N can use the distributed framebuffer 1304 to "get" data for a tile and generate render data for the tile. To get a tile, any object, such as the distributed renderer 1308, can request for the distributed framebuffer 1304 to send a message containing some part or all of the tile data stored at that node. The data may then be delivered to the messaging layer 1302. For example, the distributed render 1308 can request for the distributed frame buffer 1304 to get tile data "A" for rendering. The master node 1309, via the load balancer 1311 or another render operation assignment mechanism, can determine that tile "A" is to be rendered by renderer 1312N on worker node 1310N. A message, via the messaging layer 1302 can be transmitted containing the data to be rendered for tile A. In one embodiment the message is transmitted via the messaging layer 1302 from the master node 1309 on behalf of a portion of the logic for the distributed framebuffer 1304 that is executing on the master node 1309. In one embodiment the render data for tile A is rendered entirely by the renderer 1312N, as managed by the load balancer 1311 of the master node 1309. In one embodiment, the render data for a tile may be further sub-divided into additional render operations that may be performed by the originally assigned renderer (e.g., renderer 1312N for Tile A), as well as any of the other renderers 1312A-N that have available compute or communications bandwidth.

Once render data is generated, the generated render data may be "set" by the renderer 1312A-N and the distributed frame buffer 1304 can automatically route the render data to the worker or owner node that has ownership of the tile. For example, Tile A and Tile D are illustrated as being owned by a specific worker 1310A. A set operation can be performed by the renderer 1312N for Tile A via the distributed frame buffer 1304. The distributed frame buffer 1304 can handle the set operation via a write tile message 1315 via the messaging layer 1302 to route the Tile A render data to the appropriate worker 1310A that has ownership of Tile A data.

Upon receiving the write tile message 1315, the instance of the distributed frame buffer 1304 executing on the worker node 1310A having ownership of the tile (e.g., Worker 1310A for Tile A) can merge the received render data with the existing data for the tile. In one embodiment, distributed frame buffer 1304 can be reconfigured to change the way the merging is performed to realize different functionality. In one embodiment, the distributed frame buffer 1304 can implement merge modes including but not limited to a write once mode, a z-composing mode, and an alpha-compositing mode.

For example and in one embodiment, in the "write once" mode the distributed frame buffer 1304 configures the worker (e.g., worker 1310A) to simply write the rendered data output from the renderer (e.g., 1312N) into the appropriate buffer (e.g., accumulation, color, depth, etc.). Once all pixels are written, the tile is passed to final tile processing. In the "z-compositing" mode (or any other sort-last compositing mode such as, but not limited to, alpha blending based compositing) each worker 1310A-N renders multiple instances of render data for each tile with associated Z or depth data for each rendered pixel within the tile. The distributed frame buffer 1304 can then route the rendered tiles to the appropriate owner nodes using z-composite messages passed via the messaging layer 1302. Upon receipt of a z-composite message the owner node for the tile can perform z-compositing into the tile. Once all instances are z-composited for a tile, the tile is passed to final tile processing. In "alpha-composite" mode a first copy of the tile is buffered within the associated instance of the distributed frame buffer associated with the tile until all render data associated with the tile is received by the respective worker nodes 1310A-N having ownership of the respective tiles. Once all instances of the tiles are received, the owner node for each tile can alpha-blend the tiles using whichever compositing order is specified (e.g., per-tile as specified by the renderer, per-tile based on the closest pixel, or per-pixel based on sample distance). Once all instances of the tile are blended the result is may be passed to final tile processing. In each instance, the composition or writing operations for each tile is performed by whichever one of the worker nodes 1310A-N has ownership of the specific tile, without regard to which instance of the distributed renderer 1308 (e.g., renderer 1312A-N) generated the render data. The order in which tiles are composited may either be specified explicitly by the application, or can be determined on-the-fly during the compositing operation, for example by sorting all of a pixel's inputs from the different workers based on some per-pixel data such as the pixel's Z value.

The tile data written by the written by the distributed frame buffer 1304 to the respective worker nodes 1310A-N having ownership of the tile data may be "Full Data," or "Fat Pixel" data, particularly when compositing operations are to be performed. The Full Data for a tile can include multiple color buffer samples per pixel within the tile. The Full Data for each tile may additionally include an accumulation buffer, depth buffer, one or more color buffers having red, green, blue, and alpha channels (RGBA), which may be in a high-resolution or floating point (e.g., float4) format. Additionally, the Full Data for a tile may also include multiple instances of the distributed frame buffer 1304, each instance having a different resolution or color depth. Once writing and/or composition is complete for a tile (e.g., the final color, depth, etc. buffers are known), accumulation buffering may be performed, where the final data for a tile is copied to an accumulation buffer for merging with previous or subsequent data for the tile. Additionally, the worker node 1310A-N having ownership of a tile may also perform other post-processing operations (e.g., tone mapping) on the tile data. In one embodiment, the tile is marked as done (e.g., by updating an internal counter) and the master node 1309 may be notified of the completion of the tile.

In one embodiment, the master node 1309 may request to be send either none or only a subset of each tile, or for this final pixel data to be sent at lower resolution or in compressed form. For example, though workers may store high-resolution RGBA, depth, color, and accumulation data, the master may request to be sent only low-resolution 24-bit RGB or 32-bit RGBA color data.

The distribution of data can vary based on the use case for which the distributed frame buffer 1309 is employed. In a display wall implementation, the master node 1309 may not receive any pixel data, or only a sub-set, reduced, or compressed representation of the color data. Instead, the distributed frame buffer 1304 employs a tile post-processing routine on each of the worker nodes 1310A-N having ownership of a tile. The worker nodes 1310A-N then passes final tiles to display servers operating a display wall library (e.g., the DisplayCluster library from the Texas Advanced Computing Center). Tile accumulation, tone mapping, and tile compression for sending to the display wall can execute in a distributed manner on the workers 1310A-N, without the master node 1309 receiving any of the high-bandwidth data. In addition, the master node may or may not request a lower-resolution version of the pixel data, in which case the worker nodes can produce this lower-resolution representation and send it to the master.

In one embodiment, the distributed frame buffer 1304 is utilized in a parallel ray tracing or volume rendering environment that utilizes progressive refinement. In such embodiment, ray tracing or volume rendering data is distributed to all of the worker nodes 1310A-N and arbitrary renderers 1312A-N within the worker nodes 1310A-N are used to render the individual tiles. The rendered tiles are stored on the respective worker nodes 1310A-N based on ownership assignments provided the master node 1309. The data for the rendered tiles can be stored in high-precision floating-point buffers and accumulated, tone mapped, or otherwise post-processed at the tile owners. In such embodiment, the master node 1309 receives, at most, only low-bandwidth final color data (e.g., 8-bit RGB).

In one embodiment the distributed frame buffer 1304 is utilized in a distributed-data ray tracing or volume rendering implementation. In such embodiment, all worker node 1310A-N render all tiles for an assigned portion of the data. The distributed frame buffer 1304 can then perform composition operations. In one embodiment the composition operations include z-compositing for surface data or alpha blending for volume data. An application coupled to the distributed-data ray tracer receives the final frame data without knowledge of the composition.

The distributed framebuffer system 1300 of FIG. 13 is exemplary and other embodiments may vary in arrangement. Additionally, other use cases are possible. For example, the distributed frame buffer 1304 may be used for tile-based rasterization, or distributed rendering load balancing based on arbitrary regions of a frame, up to and including load balancing on a per-pixel basis. For example, render data for different samples of a single pixel may be generated by multiple different worker nodes 1310A-N, where the distributed frame buffer 1304 utilizes a specific worker node to resolve the multiple samples into a single pixel value.

Figure 14:
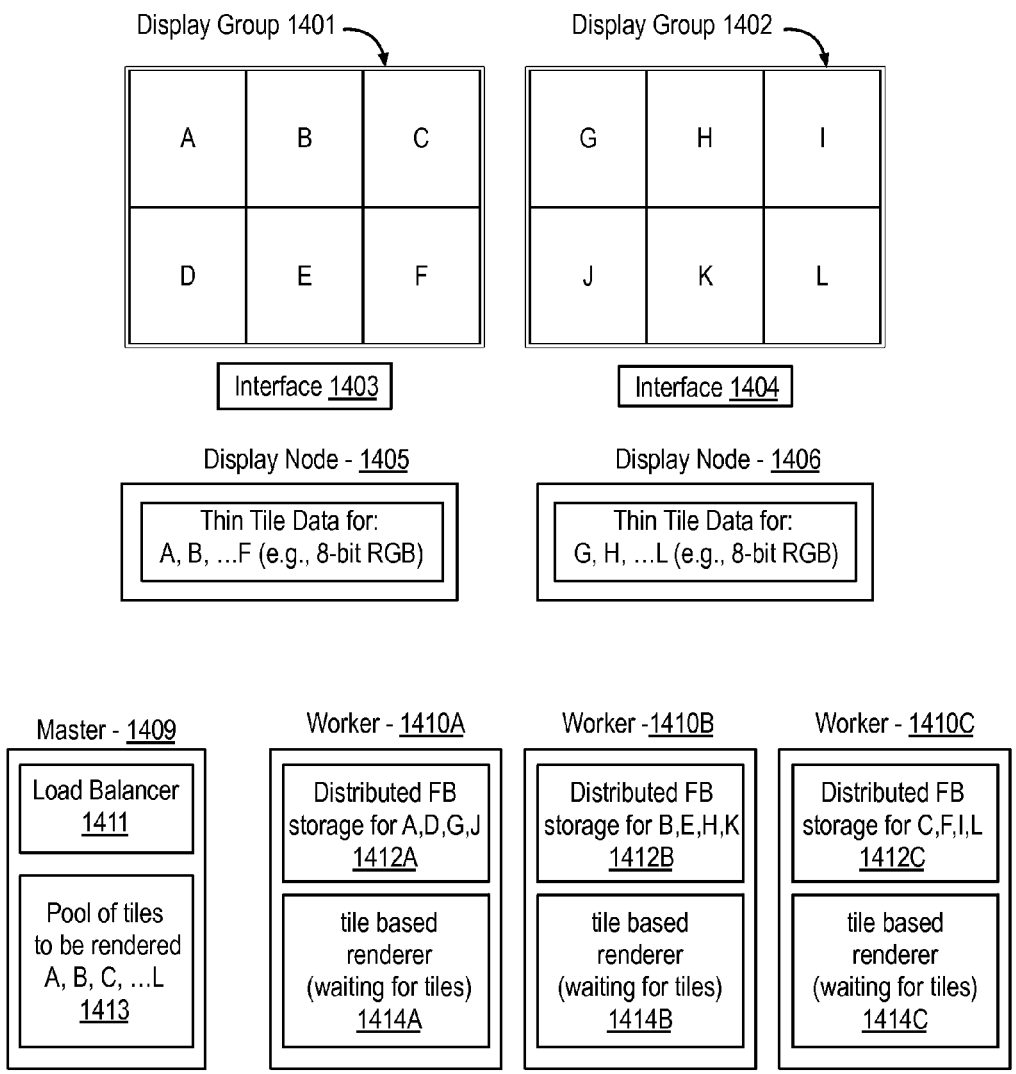
FIG. 14 is a block diagram of a distributed framebuffer display system, according to an embodiment.

FIG. 14 is a block diagram of a distributed framebuffer display system 1400, according to an embodiment. The distributed framebuffer display system 1400 illustrates a specific and exemplary implementation of a distributed frame buffer according to one embodiment and details of other embodiments may vary. As illustrated, the distributed framebuffer rendering and display system 1400 includes a first display group 1401 and a second display group 1402. Each display group 1401, 1402 includes multiple display devices arrange in a grid, where each display device is associated with a specific tile to be rendered and displayed. As illustrated, the first display group 1401 includes display regions A, B, C, D, E, and F, while the second display group includes display regions G, H, I, J, K, and L. The first display group 1401 couples with a first display node 1405 via a first interface 1403. The first display node 1405 stores thin tile data (e.g., 8-bit RGB) for each of tiles A, B, C, D, E, and F, which are to be displayed as corresponding display regions on display group 1401. The second display group 1402 couples with a second display node 1406 via a second interface 1404. The second display node 1406 stores thin tile data for each of tiles G, H, I, J, K, and L, which are to be displayed as corresponding display regions on display group 1402.

FIG. 14 illustrates the system as initially configured, in which the master node 1409 includes a pool of tiles 1413 to be rendered for each frame that is to be displayed. Ownership for each of the tiles can be determined at the beginning of each frame and can be distributed in a round-robin manner across each of the workers 1410A-C. As illustrated, ownership of A, D, G, and J is assigned to a first worker 1410A and stored in distributed framebuffer storage 1412A. Ownership of B, E, H, and K is assigned to a second worker 1410B and stored in distributed framebuffer storage 1412B. Ownership of C, F, I, and L are assigned to a third worker 1410C and stored in distributed framebuffer storage 1412C.

In one embodiment, the distributed framebuffer storage 1412A-C is provide as a service by the distributed framebuffer to the workers 1410A-C, such that the distributed framebuffer routes data to be rendered to the respective workers 1410A-C, while also routing rendered data for each tile to the worker having ownership of the tile. At the beginning of each frame, the renderers 1414A-C of each worker 1410A-C may not have a specific rendering assignment and the pool of tiles 1413 can be dynamically assigned to a tile based renderer 1414A-C within each of the worker nodes 1410A-C on a frame-by-frame basis based on actions performed by the load balancer 1411. The master node 1409, via the load balancer 1411, can make runtime determinations as to which node or nodes are to render which tile in the pool of tiles 1413 to be rendered, while the distributed framebuffer provides the services used to route data from the pool of tiles 1413 to the renderers 1414A-C, and to route the render data from the renderers 1414A-C to the appropriate ones of the workers 1410A-C having the distributed framebuffer storage 1412A-C for tile. An exemplary render operation for a tile can proceed as illustrated in the sequence diagram of FIG. 15.

Figure 15:
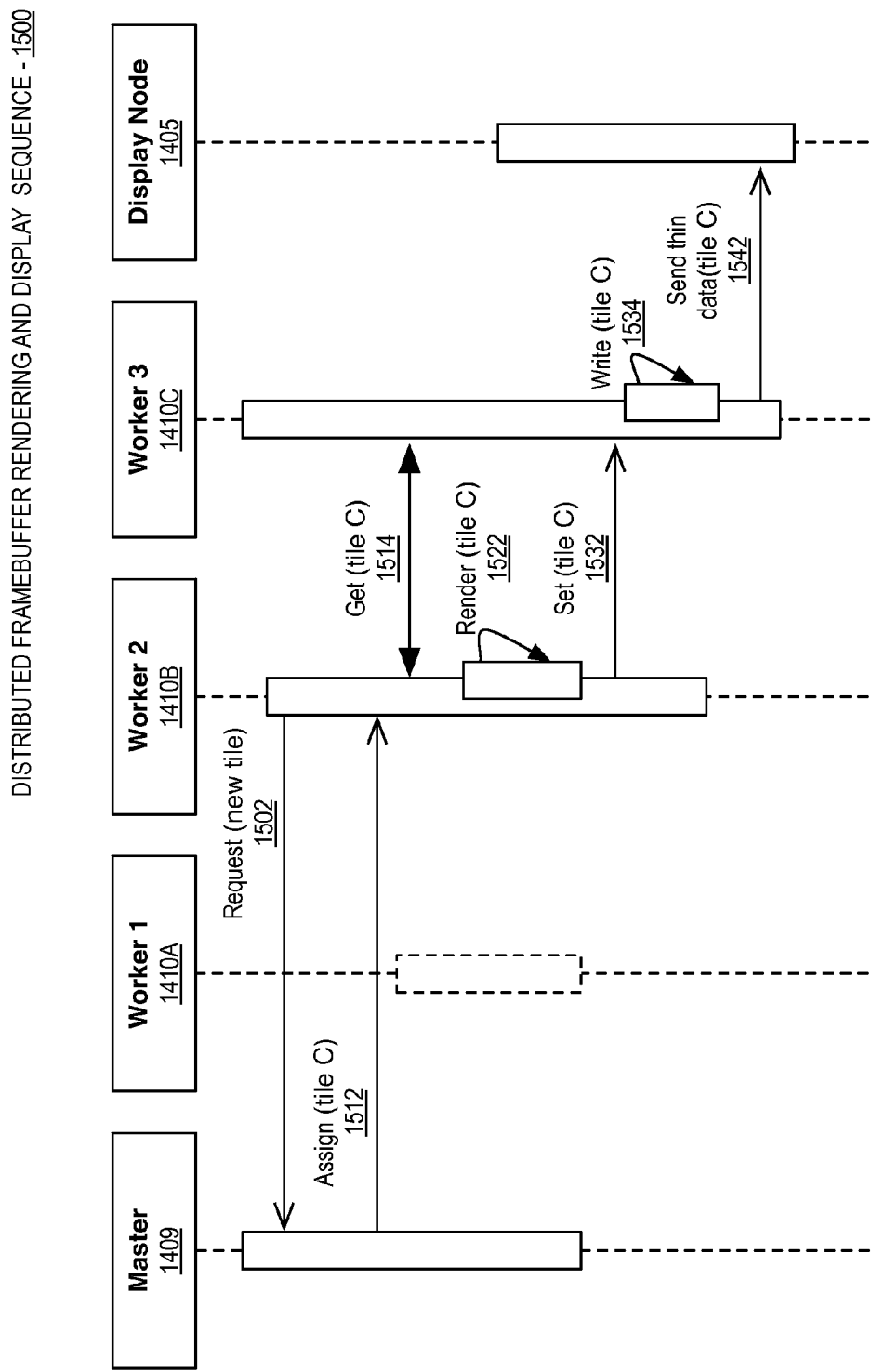
FIG. 15 is an illustration of a distributed framebuffer rendering and display sequence, according to an embodiment.

FIG. 15 is an illustration of a distributed framebuffer rendering and display sequence 1500, according to an embodiment. In one embodiment the distributed framebuffer rendering and display system 1400 of FIG. 14 can perform the illustrated sequence 1500. Each of the messages and operations illustrated can be facilitated via the distributed frame buffer 1304 via the messaging layer 1302, as illustrated in FIG. 13.

In one embodiment, a worker, such as the second worker 1410B, can request a new tile 1502 to render when a renderer (e.g., renderer 1414B of FIG. 14) has or has access to computational bandwidth to perform an additional rendering operation. In response, the master node 1409 can assign 1512 a tile, for example, tile C, to the second worker 1410B. In one embodiment, rendering operations for tile C may make use of data from a previously rendered version of tile C, either from a different worker node or from a previous frame. In such embodiment the second worker 1410B can perform a distributed framebuffer "get" 1514 operation for existing data for tile C from the third worker node 1410C, which has been previously assigned ownership of tile C. During the get 1514 operation, at least a portion of the previously generated render data for tile C can be transferred from the third worker 1410C, which has ownership of tile C, to the second worker 1410B, which has been assigned a current render operation for tile C.

Having received any prerequisite data to render a version of tile C for the current frame, the second worker 1410B can perform a render 1522 operation for tile C. In various embodiments, the render operation may be a rasterization operation, a ray tracing operation, or a hybrid rasterization and ray tracing operation that performs portions of a rendering operation using rasterization and other portions (e.g., lighting, shadows, reflections, etc.) of the rendering operation using ray tracing.

After performing the render 1522 for tile C, the second worker 1410B can use the distributed framebuffer set 1532 operation for tile C, which will automatically route the tile C render data to the worker node having ownership of tile C (e.g., third worker 1410C). In one embodiment, for both the get 1514 operation and the set 1532 operation, the messaging between workers is relayed via the distributed framebuffer (e.g., via a messaging layer) without the workers requiring explicit knowledge of which of the other works the data will be retrieved from or sent to.

In one embodiment, the distributed frame buffer, in response to the set 1532 operation for tile C, can relay a message to the third worker 1410C. Having received the message containing the set 1532 data for tile C, the third worker 1410C, as the owner of tile C, can perform a write 1534 operation for tile C. The write 1534 operation may be a simple write operation or a composition operation (e.g., z-composite, alpha-composite), in which the render data received from the second worker 1410B via the distributed framebuffer is combined with previously rendered data for tile C.

In one embodiment, the write 1534 for tile C writes to a high precision floating point buffer, such as a 32-bit or 64-bit per channel floating-point color buffer. The write 1534 may also include access to or modification of several other buffers, such as a depth buffer. The write 1534 may also include an additional write to or read from an accumulation buffer that stores previously rendered data. Additionally, the write 1534 may also include one or more post processing operations (e.g., tone mapping) in addition to any composition that may also be performed. Once the file buffers for the tile for the current frame are determined, a final buffer of thin, lower precision color data may be determined for display. For example, a final thin pixel buffer may be filled with 24-bit integer color data having 8 bits per R, G, and B channel. The third worker 1410C may then send 1542 the thin data for the tile to the display node 1405 that is responsible for storing the final pixel data for tile C before being displayed on the assigned display (e.g., display region C of display group 1401).

Figure 16:
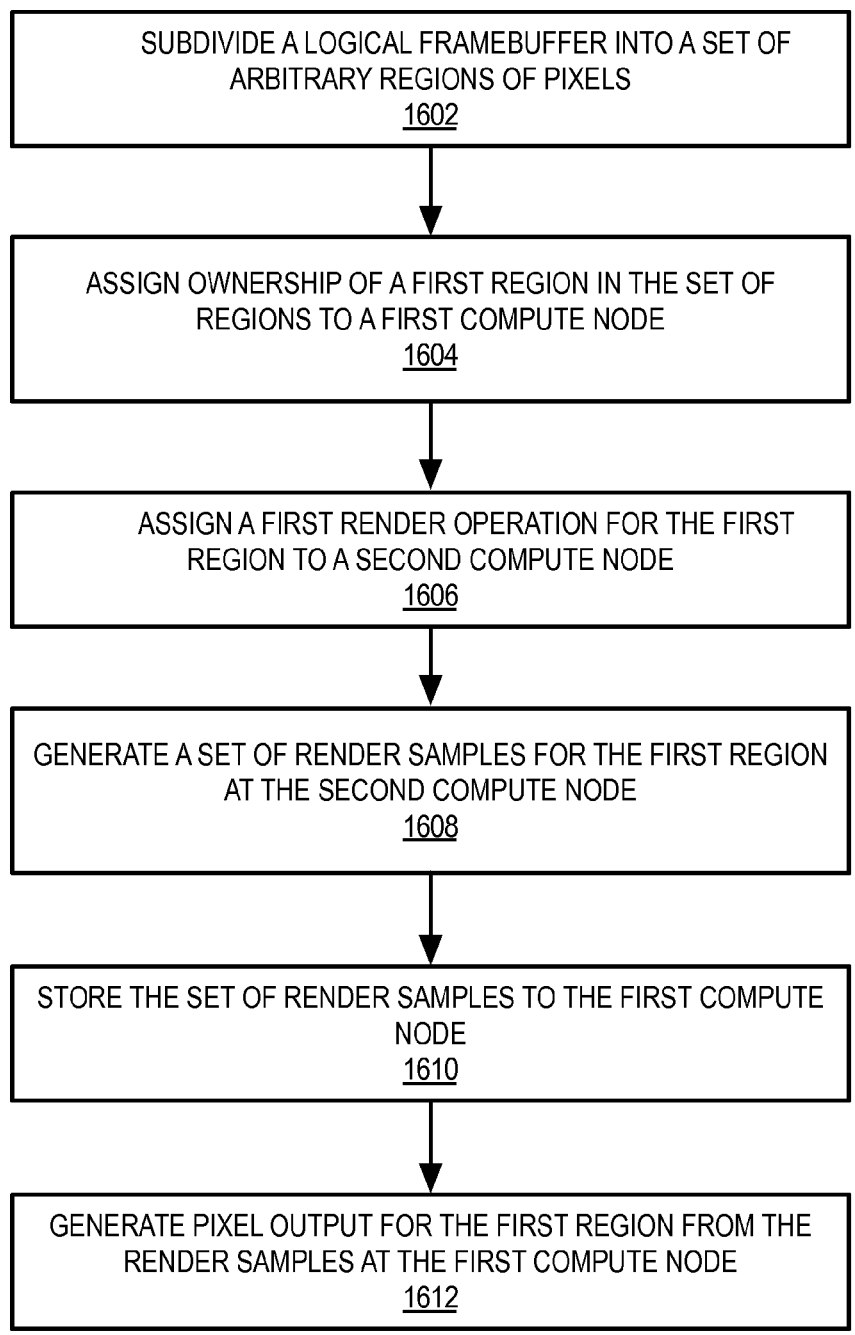
FIG. 16 is a flow diagram of distributed framebuffer parallel rendering process, according to an embodiment.

FIG. 16 is a flow diagram of distributed framebuffer parallel rendering process 1600, according to an embodiment. In one embodiment, the process 1600 includes to subdivide a logical framebuffer into a set of arbitrary regions of pixels, as shown at block 1602. The arbitrary regions of pixels may be a tiled (e.g., rectangular) region of pixels, an irregular region of pixels, or may be single pixel. In one embodiment, the arbitrary region is a sub-pixel region, where one or more sub-pixel regions exist per-pixel. In one embodiment, the process 1600 additionally includes to assign ownership of the first region in the set of regions to a first compute node, as shown at block 1604. The first compute node may be processor in a multi-processor system or a processing system within a clustered or parallel processing system. In one embodiment, the clustered or parallel processing system may include one or more compute nodes residing within a virtual machine.

In one embodiment, the process additionally includes to assign a first render operation for the first region to a second compute node, as shown at block 1606. In one embodiment, this assignment is performed at the request of the second compute node, where the second compute node automatically requests a region to render, for example, when the second compute node is idle, or has additional computational capacity to perform additional render operations. In one embodiment, this assignment is performed as a result of a request by a distributed renderer, where the distributed renderer has detected additional computational capacity within the distributed rendering system. The distributed framebuffer, having received the request from the distributed renderer, can determine a render assignment for the first region. In one embodiment, the distributed framebuffer can identify a region for the distributed renderer to render and the distributed renderer can determine a render node to perform the render operations for the region. In each case, the distributed renderer may be a parallel renderer, a data-distributed renderer, or a data-distributed parallel renderer.

In one embodiment, the process 1600 includes to generate a set of render samples for the first region at the second compute node, as shown at block 1608. The set of render samples for the first region may be generated by any rendering technique. The process 1600 can further include to store the set of render samples to the first compute node, as shown at block 1610, where the first compute node was assigned ownership of the first region, as shown at block 1604. The first compute node, having ownership of the first region, can generate pixel output for the first region from the render samples, as shown at block 1612. Generating the pixel output for the first region can include a number of post processing operations on the render samples, including performing anti-aliasing or refinement using the multiple samples or performing composition operations on the render data (e.g., z-compositing, alpha blending, etc.).

In various embodiments the various nodes of the distributed framebuffer and/or the distributed/parallel rendering systems and processes illustrated in FIGS. 13-16 may be separate computing platforms connected via a network. For example, each computing platform may be implemented as a separate data processing system, such as the processing system 100 as in FIG. 1. The data processing system may perform rendering or computational operations using one or more processor and/or graphics processor devices, such as the graphics processors illustrated in FIGS. 2-12. In various embodiments, the nodes of a distributed framebuffer and/or distributed renderer as described herein reside in a single platform or apparatus housing one or more many integrated core (MIC) processors coupled to an internal bus of the platform or apparatus. In one embodiment the distributed framebuffer is implemented across multiple independent computing platforms, where one or more platforms include one or more MIC processors coupled to an internal bus of the platform or apparatus.

Figure 17:
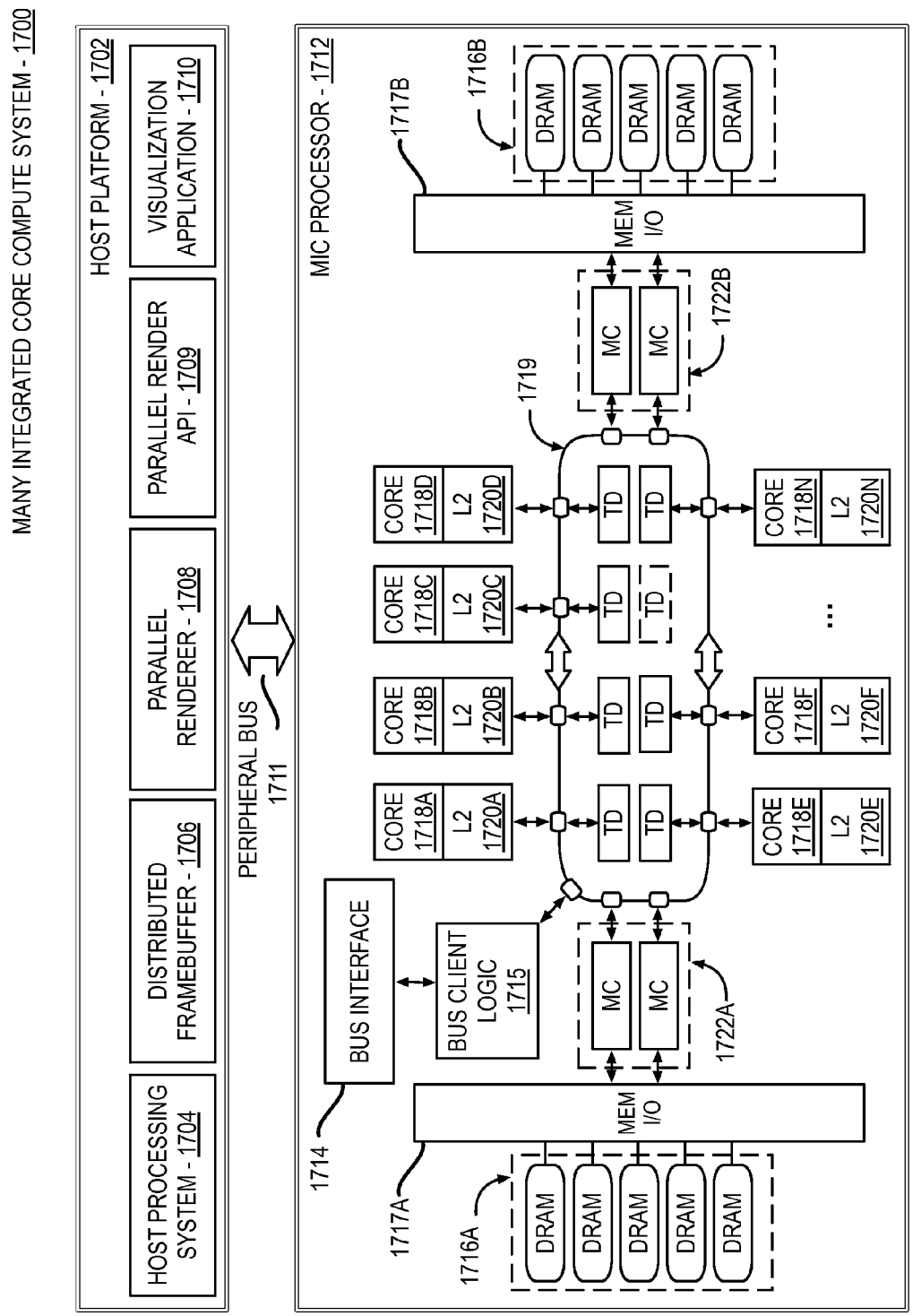
FIG. 17 is a block diagram of an exemplary MIC compute system, according to an embodiment.

FIG. 17 is a block diagram of an exemplary MIC compute system 1700, according to an embodiment. In one embodiment, the MIC compute system 1700 includes a host platform 1702 including a host processing system 1704, a distributed framebuffer 1706, a parallel renderer 1708, and a visualization application 1710. In one embodiment, a parallel render API 1709 enables communication and cooperation between the visualization application 1710 and the parallel renderer 1708 and/or distributed framebuffer 1706.

In one embodiment the host platform couples with or includes a MIC processor 1712. The MIC processor 1712 may couple with the host platform via a peripheral bus 1711. In one embodiment, the host platform 1702 may also access compute resources with a MIC processor 1712 within a separate platform via a network interface. One having skill in the art will understand that the MIC processor 1712 shown in FIG. 17 is exemplary and not limiting as to any specific processor architecture or instruction set.

The exemplary MIC processor 1712 includes a bus interface 1714 to couple the MIC processor 1712 to the peripheral bus 1711. The bus interface 1714 couples to bus client logic 1715, which couples to a bi-directional ring interface 1719. The bi-directional ring interface 1719 also couples to a layer-2 (L2) cache 1720A-N for each of the multiple processor cores 1718A-N within the system. In one embodiment, cache coherence is maintained via a distributed tag directory. In one embodiment the MIC processor 1712 includes multiple units of local memory 1716A-B, such as DRAM memory, which in one embodiment is graphics double data rate (GDDR) DRAM. The local memory 1716A-B can couple to one or more memory controllers 1722A-B via one or more memory interface busses 1717A-B.

In one embodiment, parallel processes such as the parallel renderer 1708, distributed framebuffer 1706, and/or the visualization application 1710 can access compute resources in the host processing system 1704 and the MIC processor 1712 via any one of several parallel processing APIs including OpenCL, OpenMP, MPI, hybrid OpenMP/MPI, or POSIX socket programming. For example, each processor core 1718A-N of the MIC processor 1712 may be configured as a separate MPI rank (e.g., compute node), such that distributed framebuffer 1706 and/or parallel renderer 1708 can perform operations using the MIC processor 1712. In one embodiment the host processing 1704 may also be included as an MPI rank.

In one embodiment, a visualization application 1710, which may be data parallel or data distributed, can interface with the parallel renderer 1708, distributed framebuffer 1706, and/or host processing system 1704 via a parallel render API 1709. The parallel render API 1709 may be a parallel render API known in the art, or may include API extensions such as those described below.

API Extensions for Data-Distributed Parallel Rendering

In one embodiment, the distributed frame buffer described in FIGS. 13-17 may be used in conjunction with a parallel or data-distributed ray tracer. However, the de-facto standard for data-parallel rendering using application-side image-compositing may be inadequate for distributed ray tracing using data parallel applications. Existing ray tracers either lack an API for use with a data-parallel application or the existing APIs are not optimized for use with data-parallel applications. For example, many distributed ray tracers are implemented as special case solutions that do not allow for external interfacing. Those that allow external interfacing assume a single application process and are inadequate for use by a data-parallel external application.

One embodiment provides for API extensions that enable an application that is itself data-parallel to communicate with a data-parallel renderer. Although some aspects of the API extensions are described with respect to ray tracing, the API extensions described herein may be also used for distributed rendering using rasterization or hybrid techniques, splatting, volume rendering, or any other rendering technique.

In one embodiment, the API extensions enable a data-parallel application to communicate with a data-parallel renderer to express details such as which data is owned where (e.g., which rank/node, etc. has ownership of a particular data object). In one embodiment, ranks or nodes of the data-parallel application may use the same API to communicate with the renderer. The extensions described herein may be used to modify how existing API functions affect the different ranks or nodes of a group of data-parallel rendering processes. For example, one set of API extensions can be used to enable a data parallel application to set the scope of a subsequent group of API calls or functions. An additional set of API extensions can be used to set the target of a subsequent group of API calls or functions. An additional group of API extensions can be used to set a render mode for a group of data-distributed render operations. In general, the API extensions described may be used to define a general data-parallel computing paradigm similar to a data-parallel remote procedure call, where centralized, individual, or collaborative methodologies can control how a given rank or node's call to a "remote" procedure (e.g., a procedure remote to the given rank or node) impacts other ranks executing the distributed process or application.

Figure 18:
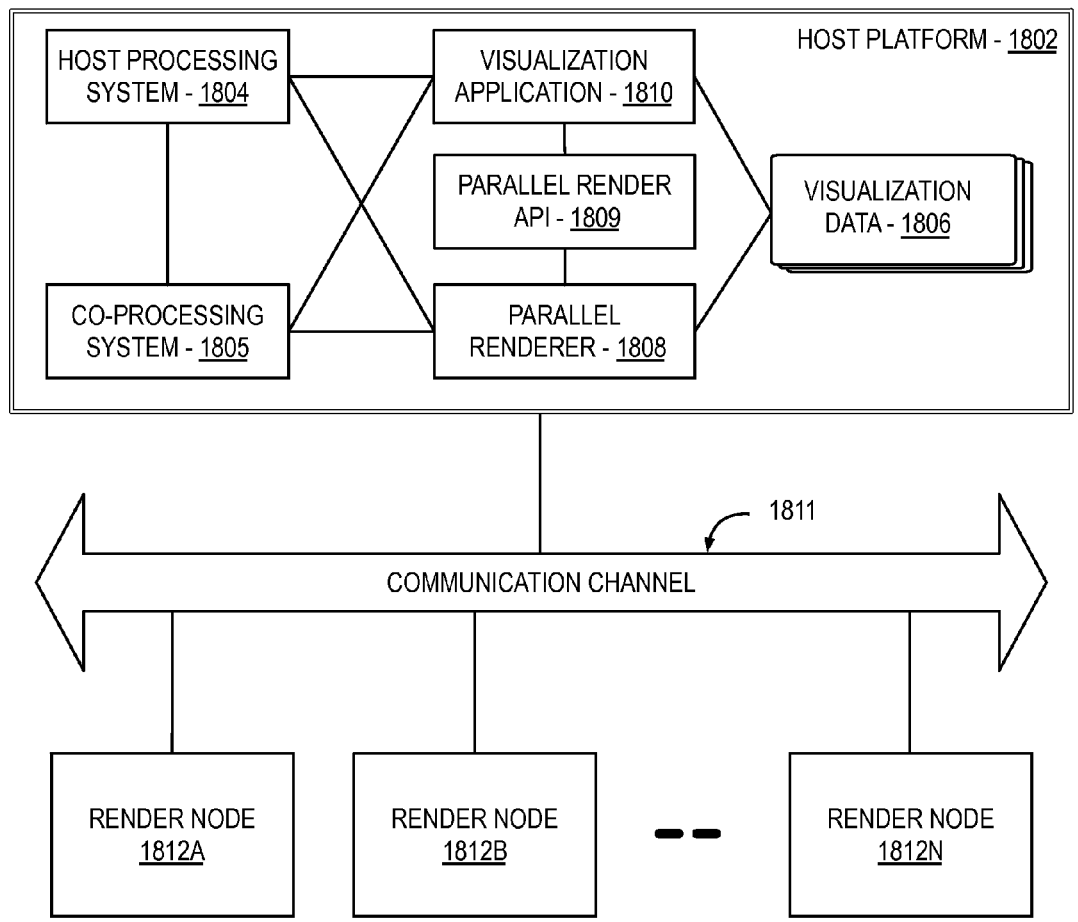
FIG. 18 is a block diagram of a system for performing data-distributed parallel rendering, according to an embodiment.

FIG. 18 is a block diagram of a system 1800 for performing data-distributed parallel rendering, according to embodiment. In one embodiment, the data distributed parallel rendering system 1800 includes a host platform 1802 having a host processing system 1804 and a co-processing system 1805, where the host processing system 1804 is a multi-core or multi-processing computing system that executes operating system and applications for the host platform and the co-processing system 1805 is a MIC co-processor capable of native execution processes or the processing of offloaded processes from the host processing system 1804. In addition to the processing functionality provided by the host processing system 1804 and the co-processing system 1805, the system 1800 may also include multiple other platforms operating as a set of render nodes 1812A-N. The render nodes 1812A-N may couple with the host platform 1802 via a communication channel 1811, which may be implemented over a general-purpose data network (e.g., Ethernet, etc.).

A visualization application 1810, which may be a data-distributed parallel visualization application can include multiple threads or processes that execute on one or more of the host processing system 1804, co-processing system 1805, and/or one or more of the render nodes 1812A-N. The visualization application 1810 can manage a set of visualization data 1806 (e.g., volumes, objects, geometric primitives) that are rendered via a parallel renderer 1808. The parallel renderer 1808 may be a parallel rasterizer or a parallel ray-tracer. In various embodiment, as described herein, a parallel renderer API 1809 is provided to enable communication between a data distributed parallel visualization application 1810 and an implementation of a parallel renderer 1808.

Existing implementations of data distributed and/or data parallel rendering include to perform "sort last" parallel rendering in which a visualization application performs data decomposition, then performs "local" rendering on each node using OpenGL or any other local rendering API using locally stored data. The application may then perform a composition operation using the locally rendered results from each node. In this mode, the application operates in a data-parallel manner while each renderer performs local rendering at each rendering node. This implementation cannot easily make use of ray tracing, as ray tracing generally requires a global view of all data.

Existing data-parallel rendering solutions additionally include "sort first" or "sort middle" techniques in which different nodes send different triangles for rendering and the renderer routes the triangles to different nodes for processing. As with sort last parallel rendering, these approaches do not easily map to ray tracing.

The typical approach to data-parallel ray tracing utilizes a single application node in communication with a data-parallel ray tracer. In such approach, the ray tracer determines how to distribute the data, for example by file-loading different model parts on different nodes, or by transparently splitting the geometry specified by the single application across multiple nodes. In order to use data-parallel ray tracing from an existing, data-parallel application, for example, an application in which the application has ownership of the data and/or data distribution, API functions are needed to enable the data-parallel application to properly express how the ray tracer is to access and use the application owned data.

In one embodiment, the set of API extensions can be used to enable a data parallel application to set the scope of a subsequent group of API calls or functions, where the scope includes one of a global, local, collective, or targeted scope. The global (or "centralized") scope indicates that that the effects of an API call made on a given rank or node will take effect on all ranks/nodes, irrespective of the node making the call. For example, a "render frame" call executed by rank 0 while in this mode will be executed by all ranks. One embodiment additionally provides for a variant of the global/centralized scope in which the API call is performed on only a subset of ranks or nodes instead of all ranks or nodes. The local (or "individual") scope indicates that any rank can issue API calls, but the effects of that call will apply only to the rank performing the call. For example, a rank setting data values of a globally visible object to the rank's local data will only affect the instance of that object that lives on that rank. One embodiment additionally provides for a variant of the local/individual scope in which any rank or node can issue API calls, but the rank or node can specify (e.g., target) which node or nodes are to be affected by the API call. The collective scope indicates that all ranks execute the same API call in a collective and consistent manner. For example, a "create new volume object" call will create a new volume object that is visible on all nodes, and each rank will receive a valid handle that expresses the newly created object. The targeted scope can be used to specify a rank on which a given API call is to have effect.

Figure 19:
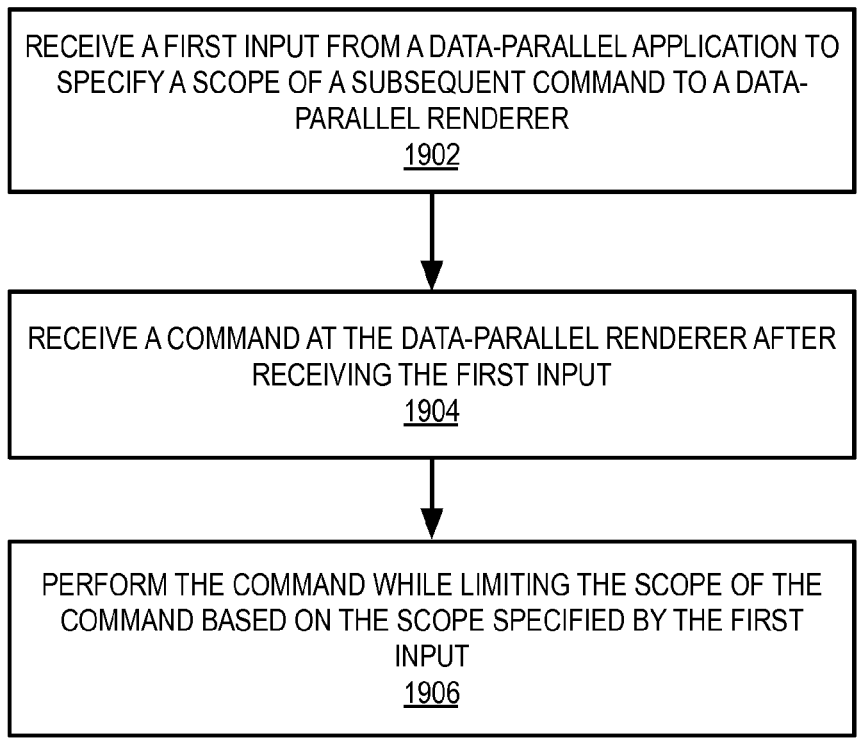
FIG. 19 is a flow diagram of logic for extending a data-distributed parallel rendering API, according to embodiment.

FIG. 19 is a flow diagram of a data distributed parallel rendering API logic 1800 for extending functionality within a data-distributed parallel rendering API, according to embodiment. In one embodiment, the logic 1900 includes to receive a first input from a data parallel application to specify a scope of a subsequent command to a data-parallel renderer, as shown at block 1902. The logic 1900 can additionally perform operations to receive a command at the data-parallel renderer after receiving the first input, as shown at block 1904. Once the command is received, the data parallel renderer can perform the received command while limiting the scope of the command based on the scope specified by the first input, as shown at block 1906.

In one embodiment, the scope specified for the command can include one of a global scope, a local scope, collective scope, or targeted scope. For example, a data-distributed and/or parallel renderer can receive a first input via an API to specify a global data scope, receive a request to execute a render command on a first node of the multiple render nodes, and execute the render command in parallel on each of the multiple render nodes. The first input may also be to specify a local data scope, where a subsequently received request to modify render data stored on multiple render nodes of the data parallel renderer. The distributed renderer can then modify a different local instance of the render data across the multiple render nodes. A collective scope may also be specified. When in the collective data scope, all ranks or nodes execute the same API call in a collective and consistent manner. For example, a "create new volume object" call will create a new volume object that is visible on all nodes, and each rank will receive a valid handle that expresses this object. A targeted scope may also be specified. When in the targeted mode, an additional input can be used to specify a target of a command to follow the first input. The command can then be performed by the rank or node specified as the target.

Figure 20:
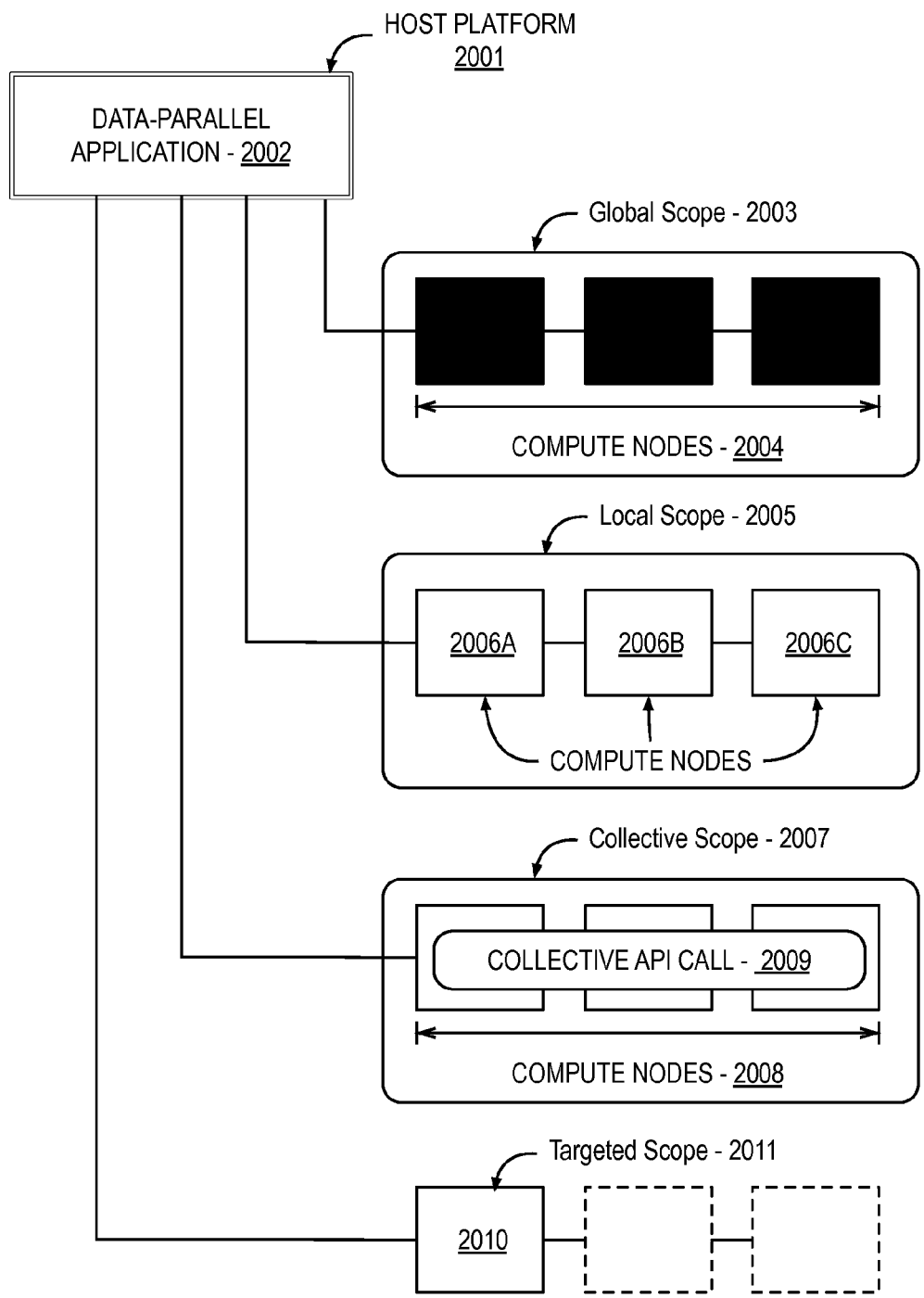
FIG. 20 is a block diagram illustrating operation of the data distributed parallel rendering scope API logic, according to embodiment.

FIG. 20 is a block diagram illustrating operation of the data distributed parallel rendering scope API logic 2000, according to embodiment. In one embodiment, a host platform 2001 executing a data-parallel application 2002, for example a data parallel visualization application, can couple to multiple sets of compute nodes to perform a variety of compute or rendering operations.

In one embodiment, when operating in a global scope 2003, API calls or commands are executed globally across a set of compute nodes 2004, which may be all compute nodes 2004, or only a subset (e.g., less than all) of the compute nodes 2004. When operating in a local scope 2005, API calls or commands are executed on multiple compute nodes (e.g., compute nodes 206A-C), where each compute node operates on a local instance of data. In one embodiment, when operating in a local scope 2005, API calls or commands can be issued by any of the compute nodes 2006A-C, while specifying a different compute node as a target. In such embodiment, a compute node, while operating in the local scope 2005, may specify a target from which to retrieve data. For example, compute node 2006A can issue an API call to retrieve an data stored on computer node 2006B. When operating in a collective scope 2007, each of multiple compute nodes 2008 execute a collective API call 2009. When operating in a targeted scope 20011, a specific compute node (e.g., compute node 2010) is targeted to perform specific API calls or commands.

An example usage of an exemplary distributed rendering API scope command is shown in Table 1. The example usage illustrated incorporates example API extensions provided by embodiments into the API used by the open source, scalable, and portable ray tracing engine (OSPRay).

TABLE 1

Exemplary Distributed Rendering API Scope Command

Typedef enum { OSP_GLOBAL_SCOPE=OSP_MASTER_SCOPE, OSP_LOCAL_SCOPE, OSP_COLLECTIVE_SCOPE } OSPDpScope;
void ospDpSetScope(OSPDpScope scope);
ospDpInit(....); // initialize distributed rendering
...
// create a new volume object that exists on all nodes, and get a handle that
is // valid on all nodes.
ospDpSetScope(OSP_COLLECTIVE_SCOPE);
OSPVolume vol = ospNewVolume(...);
...
// set each node's LOCAL data; after this call each instance of that volume will have // different data on each node
ospDpSetScope(OSP_LOCAL_SCOPE);
ospSet3f(vol,"bounds.min", thisNodesBounds.min);
...
ospSetRegion(vol, thisNodesVolumeData.ptr, ....);
...
// while in the local scope, an API call issued by a compute node can
// target a specific node
ospSelectTargetRank(2);
box3f boundsOn2 = ospGetBounds(objectHandleForDistribtedObject);
...
// now render data from master
ospDpSetScope(OSP_MASTER_SCOPE);
ospSetData(globalVolumeRenderer,"volume",vol);
ospRenderFrame(frame, renderer);

While exemplary API extensions to the OSPRay API are shown, embodiments are not limited to any specific API or implementation and may be utilized in the context of any parallel or distributed-data parallel renderer. In the example shown, a call to set a scope to a collective scope is made, as exemplified by the ospDpSetScope call having the collective scope parameter (e.g., OSP_COLLECTIVE_SCOPE). API commands following a set to the collective scope can be executed in a collective and consistent manner by all ranks and/or compute nodes. Such call may be used prior to creating a new object (e.g., ospNewVolume) and the newly created object will be valid across all distributed renderer nodes. A call to set a local scope is exemplified by a call to ospDPSetScope with a local scope parameter (e.g., OSP_LOCAL_SCOPE). Such call may be used to set or configure data that will be local to each compute node or rank. For example, a call to set a minimum bound for a volume (e.g., ospSet3f(vol, "bounds.min", thisNodesBounds min)) will result in each instance of the volume having different data on each rank or node. In one embodiment, while in the local scope, individual compute nodes can select a specific target for an API command if a compute node operating in the local scope is to access data stored on a different compute node. For example, a call to ospSelectTargetRank(2) can enable a subsequent call to ospGetBounds using a distributed object handle to access data using the instance of the object handle that is valid on the targeted node.

An additional call to set a global scope (which, in the example of Table 1, is aliased as a master scope) is exemplified by the ospDpSetScope call to a master/global scope (e.g., OSP_GLOBAL_SCOPE=OSP_MASTER_SCOPE). A subsequent API call after setting a global scope will perform an action specified on a given rank or node on all of the ranks or nodes. For example, if the ospSetData and ospRenderFrame commands that follow the API call to set a master/global scope are executed by any compute nodes the commands will be executed by all compute nodes.

One embodiment provides for an API call to specify the target of following calls to a distributed renderer. An example usage of the target extension is shown in Table 2. The usage illustrated is incorporated into the OSPRay API for exemplary and non-limiting purposes.

TABLE 2

Exemplary Distributed Rendering API Target Command void ospDpSelectRank(int rank); // Select a rank
void ospDpSelectRanks(int ranks, int *rank); // Select multiple ranks
ospDpSelectRank(3); // Select rank 3
// Perform the following on rank 3
ospGet3fv(volumeObject,"bounds.min",&volumeBounds.min);
ospGet3fv(volumeObject,"bounds.max",&volumeBounds.max);

As shown in Table 2, one embodiment provides for an API call that specifies a specific rank (or node) on which the following commands are to be executed. A single rank or multiple ranks may be specified. In the example shown, rank 3 is explicitly specified, such that the ospGet3fv commands that follow will operate only on the data associated with rank 3.

An addition to the scope and target API commands described above, one embodiment provides for a group of one or more API calls that can be used to set a render mode for a group of data-distributed render operations. For example, in one embodiment an API command is provided to configure the renderer to set a compositing mode, such as z-compositing or alpha blending.

In one embodiment, for ray tracing renderers, an API command can be provided to configure between a "fetching data" and a "sending rays" mode. When data-parallel rendering is used in ray tracing, data can be distributed among the different nodes and the ray tracer can either fetch data on demand to the process or nodes that require specific elements of the distributed data, or may send rays to the nodes containing the data that the rays will use to determine intersection (e.g., dynamic ray scheduling).

Embodiments may be implemented as any one or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In embodiments described herein, a distributed framebuffer avoids a centralized frame buffer and explicit compositing phases and provides a common infrastructure for scalable rendering. The common infrastructure provided enables efficient parallelization of frame buffer centric operations such as, but not limited to accumulation, refinement, filtering, tone mapping, compositing (including, in particular, depth- and alpha compositing from data-parallel rendering), and other frame buffer centric operations. In one embodiment, the pixel data that is to be collected at the master node or displayed on a display device is decoupled from the per-tile or per-pixel data that the worker nodes use to render the samples that are used to derive the final pixel data. The working data can be distributed among the workers as a variety of ways to achieve a primarily worker node to worker node communication arrangement rather than worker node to master node communication arrangement.

In one embodiment ownership of the various regions of the scene to render is decoupled from the rendering of the data for the individual regions of the frame, such that ownership of a rendering region is neither held exclusively by the master node, nor held entirely by the individual worker nodes that render each region. Instead, ownership of the various regions of the frame is implemented as a distributed frame buffer. The distributed frame buffer distributes ownership of the different regions of the frame across multiple nodes, such that ownership of the different regions is independent from the master node as well as the one or more worker nodes that may generate render output for the region. In one embodiment the distributed frame buffer can be configured to perform traditional rendering operations where render data for each region is always produced by one worker, as well as compositing based techniques where pixel data for each region is generated by multiple different nodes, with the distributed frame buffer performing whichever compositing operations for these different pixel data on the node that owns the respective image region.

In one embodiment, multiple distributed frame buffers may be rendered and processed in parallel, where each distributed frame buffer is a distributed object that has an instance on some non-empty sub-set of the worker nodes. Each of the multiple distributed frame buffers may have different pixel resolutions, different number or format of color channels, or any other sorts of per-region or per-pixel data. The data width for the channels may also differ amongst each of the multiple distributed frame buffers. In one embodiment, the distributed framebuffer object implements a "get" and a "set" operation for each region of pixels. Each worker or render node can use the distributed framebuffer to "get" data for a region of pixels and generate render data for the region. The generated render data may then be "set" by the worker or render node and the distributed frame buffer can automatically route the render data to the worker or owner node that has ownership of the region.

In one embodiment the distributed frame buffer is implemented in part using a message passing interface (MPI) for communication between the various nodes. In such embodiment, MPI messages may be used to pass pre-rendered or rendered regions of a frame between nodes. In one embodiment, the messages may be compressed during transmission to reduce the amount of communication bandwidth consumed by the messages. While MPI is used in one embodiment, any network communication method may be used where the nodes are coupled over a network. Additionally, the compute nodes may be processor cores within a host platform that are coupled via an interface bus and may communicate via any multiprocessor communication method.

As described herein, regions of a frame may be arbitrary regions of pixels, including an irregular tile of pixels or a rectangular or square tile of pixels. The worker nodes may include a tile-based rasterizer, volume renderer, splatting-based renderer, etc., that operates on independent tiled regions. Ownership of the regions or tiles of a frame may be distributed among multiple worker nodes. In one embodiment, ownership of tiles of a frame can be assigned to worker nodes in a round-robin fashion, where each worker node is assigned ownership of one or more tiles. In such embodiment, the render operations for the tiles can then assigned to worker nodes independently of ownership of the tiles. The render operations for the tiles can be assigned by a master node, which may include a load balancing algorithm to balance rendering operations across the worker nodes.

In one embodiment, only a subset of the workers are assigned ownership of tiles or regions of the frame, while other nodes, such as nodes with a reduced amount of memory in relation to other nodes, may be assigned rendering operations without being assigned ownership of a distributed frame buffer tile or region. In such embodiment, nodes having ownership of a tile or region may be designated as 'owner' nodes, while nodes that perform rendering operations may be designated as 'render' nodes or 'worker' nodes. The owner nodes may be configured to perform composition or post-processing operations, while the render or worker nodes may be configured primarily to perform rendering operations. However, in such embodiment, each of the owner nodes may also perform at least a portion of the rendering operations, either for the region or tile for which ownership is assigned, or for other regions or tiles that may be owned by different owner nodes. In other words, based on the availability of computational resources or availability of communication bandwidth between nodes, an owner node may perform post processing operations for the tile or region for which the owner node has ownership while also performing rendering operations for a tile or region that is owned by a different node.

In various embodiments, the nodes of a distributed framebuffer and/or distributed renderer as described herein may be independent computing platforms or data processing systems coupled over a network, or may be a single platform or apparatus housing one or more many integrated core (MIC) processors coupled to an internal bus of the platform or apparatus. In one embodiment the distributed framebuffer may also be implemented across multiple independent computing platforms, where one or more platforms include one or more MIC processors coupled to an internal bus of the platform or apparatus.

In one embodiment, the distributed frame buffer described herein may be used with a parallel or data-distributed ray tracer. However, the de-facto standard for data-parallel rendering using application-side image-compositing may be inadequate for distributed ray tracing using data parallel applications. Accordingly, one embodiment provides application programming interface (API) extensions that enable an application that is itself data-parallel to communicate with a data-parallel renderer as described in conjunction with the distributed framebuffer described herein. Although some aspects of the API extensions are described with respect to ray tracing, the API extensions described herein may be also used for distributed rendering using rasterization, hybrid ray-tracing/rasterization techniques, or any other rendering technique (such as, but not limited to, splatting or volume rendering).

Embodiments provide for a graphics processing apparatus comprising multiple compute nodes coupled to a communication layer, a rendering system executing on the multiple compute nodes, wherein the communication layer enables a distributed object executing on one of the multiple compute nodes to communicate with the rendering system, and a distributed framebuffer logic to subdivide a logical screen space for a frame into multiple regions and subdivide ownership of the regions among the multiple compute nodes.

A further embodiment provides for a distributed rendering system for rendering a three dimensional scene, where the system comprises a master node having a set of tiles to render for a frame; one or more worker nodes coupled to the master node, the one or more worker nodes including a renderer to generate renderer output for at least a portion of one or more tiles in the set of tiles; and an owner node coupled to the master node and the one or more worker nodes, the owner to store the renderer output for the one or more tiles in the set of tiles in a local framebuffer, wherein the local framebuffer is a portion of a distributed framebuffer, each portion of the distributed frame buffer to store a separate portion of the frame.

A further embodiment provides for a method of rendering a frame via a distributed framebuffer, where the method comprises subdividing a logical framebuffer into a set of tiles; assigning ownership of a first tile in the set of tiles to a first compute node; assigning a first render operation for the first tile to a second compute node, the second compute node to generate a set of render samples for the first tile and store the set of render samples to the first node, the first compute node to generate pixel output for the first tile from the render samples. In one embodiment, after rendering a region of a frame, the method further includes writing the pixel output for the first tile to a first display node for display.

A further embodiment provides for a computer implemented method at a data-parallel renderer, where the method comprises receiving a first input from a data-parallel application to specify a scope for a subsequent command to the data-parallel renderer; receiving a command at the data-parallel renderer after receiving the first input; and performing the command while limiting the scope of the command based on the scope specified by the first input, wherein the scope is to specify one of a node or a number of nodes on which the data-parallel renderer is to perform the command and the command is a programming interface command received via an application programming interface.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
multiple compute nodes coupled to a communication layer;
a rendering system executing on the multiple compute nodes, wherein the communication layer enables a distributed object executing on one of the multiple compute nodes to communicate with the rendering system; and
a distributed framebuffer logic to subdivide a logical screen space for a frame into multiple regions and subdivide ownership of the regions among the multiple compute nodes, wherein the ownership of the regions is independent of which of the multiple compute nodes are performing rendering operations, wherein a compute node having ownership of a region is to store a renderer output for the respective owned region in a local framebuffer that is local to the compute node having ownership, the compute node having ownership receiving render data from a compute node not having ownership, the compute node having ownership including the received render data in the stored renderer output.

2. The apparatus as in claim 1, wherein the distributed framebuffer logic is to initialize a distributed framebuffer for the frame and subdivide the logical screen space for the frame into multiple regions, wherein one or more of the multiple compute nodes are to have ownership of one or more of the multiple regions.

3. The apparatus as in claim 2, wherein the distributed framebuffer logic is further to provide one or more operations to access the multiple regions.

4. The apparatus as in claim 3, wherein the rendering system is a distributed rendering system to render one or more of the multiple regions on the multiple compute nodes, the multiple compute nodes including at least one renderer.

5. The apparatus as in claim 4, wherein at least one renderer is to request a region to render from load balancing logic, render the region on a first compute node of the multiple compute nodes and write the rendered region via the distributed framebuffer logic to a second compute node of the multiple compute nodes, the second compute node having ownership of the region.

6. The apparatus as in claim 5, wherein the second compute node is further to process render data, wherein the render data is processed at the second compute node using one or more of a floating-point color buffer, accumulation buffer, normal buffer, discontinuity buffer, alpha buffer, depth buffer, and composition buffer.

7. The apparatus as in claim 6, wherein the second compute node is further to generate pixel output data for the region based on the render data, wherein the render data includes greater detail than the pixel output data.

8. The apparatus as in claim 7, wherein at least one renderer is a tile based renderer and the multiple regions include pixel tiles.

9. The apparatus as in claim 8, wherein the tile based renderer is a parallel rasterizer or parallel volume renderer.

10. The apparatus as in claim 8, wherein the tile based renderer is a parallel ray tracer.

11. The apparatus as in claim 1, wherein the multiple compute nodes include a many-integrated-core (MIC) processor coupled to an interface bus.

12. The apparatus as in claim 1, wherein the communication layer is a message passing interface (MPI).

13. The apparatus as in claim 12, wherein the communication layer additionally includes messaging logic to receive a message from the MPI and route the message to a target distributed object using an object handle specified in the message.

14. The apparatus as in claim 1, wherein the compute node having ownership receives render data in a write tile message via a messaging layer.

15. The apparatus as in claim 1, wherein the distributed framebuffer logic is to subdivide the logical screen space at the beginning of the respective frame.

16. The apparatus as in claim 1, wherein the local framebuffer is a portion of a distributed framebuffer, each portion of the distributed framebuffer to store a separate portion of the frame.

17. The apparatus as in claim 1, wherein the received render data is included in the renderer output by compositing output pixel data the received render data.

18. The apparatus as in claim 1, further comprising a display node coupled to the distributed framebuffer logic to store multiple portions of the frame for display via one or more displays.

\* \* \* \* \*